US012604327B2

(12) United States Patent　　　　(10) Patent No.:　US 12,604,327 B2
Iwai et al.　　　　　　　　　　　　(45) Date of Patent:　　Apr. 14, 2026

(54) COMMUNICATION DEVICE AND COMMUNICATION METHOD

(71) Applicant: Panasonic Intellectual Property Corporation of America, Torrance, CA (US)

(72) Inventors: Takashi Iwai, Ishikawa (JP); Tomofumi Takata, Ishikawa (JP); Yoshio Urabe, Nara (JP); Takayuki Nakano, Ishikawa (JP); Taichi Miura, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 367 days.

(21) Appl. No.: 18/250,296

(22) PCT Filed: Jul. 13, 2021

(86) PCT No.: PCT/JP2021/026325
§ 371 (c)(1),
(2) Date: Apr. 24, 2023

(87) PCT Pub. No.: WO2022/091490
PCT Pub. Date: May 5, 2022

(65) Prior Publication Data
US 2023/0403722 A1　　Dec. 14, 2023

(30) Foreign Application Priority Data
Oct. 28, 2020　(JP) ................................. 2020-180361

(51) Int. Cl.
*H04W 74/00*　　(2009.01)
*H04L 5/00*　　(2006.01)
(Continued)

(52) U.S. Cl.
CPC ......... *H04W 72/232* (2023.01); *H04L 5/0053* (2013.01); *H04L 69/22* (2013.01); *H04W 84/12* (2013.01)

(58) Field of Classification Search
CPC ....... H04L 69/22; H04L 5/0037; H04L 5/007; H04W 74/0833; H04W 74/002; H04W 74/006
See application file for complete search history.

(56) References Cited

U.S. PATENT DOCUMENTS

| | | | | |
|---|---|---|---|---|
| 10,925,065 | B2 * | 2/2021 | Huang | ................... H04L 47/365 |
| 2023/0398204 | A1 * | 12/2023 | Saphire | ................. A61K 39/12 |
| 2023/0403548 | A1 * | 12/2023 | Zhu | ....................... H04W 24/10 |

FOREIGN PATENT DOCUMENTS

WO　　WO 2020112021 A1　　6/2020

OTHER PUBLICATIONS

IEEE 802.11-20/0764r1 Title: Trigger Consoideration (Year: 2020).*
(Continued)

*Primary Examiner* — Faruk Hamza
*Assistant Examiner* — Abusayeed M Haque
(74) *Attorney, Agent, or Firm* — Seed Intellectual Property Law Group LLP

(57) ABSTRACT

A communication device (100) comprises: a circuit (11) that sets a first value to an association ID (AID) 12 subfield of the first field of a trigger frame requesting an extremely high throughput (EHT) trigger-based (TB) physical layer protocol data unit (PPDU); and a transmitter (12) that transmits the trigger frame. The first value indicates that the first field contains information to be shared for the transmission of the EHT TB PPDU.

17 Claims, 30 Drawing Sheets

HE format Common Info

| Trigger Type | UL Length | More TF | CS Required | UL BW | GI And HE-LTF Type | MU-MIMO HE-LTF Mode | Number Of HE-LTF Symbols And Midamble Periodicity | UL STBC | LDPC Extra Symbol Segment | APTx Power | Pre-FEC Padding Factor | PE Disambiguity | UL Spatial Reuse | Doppler | UL HE-SIG-A2 Reserved | Reserved | Trigger Dependent Common Info |
|---|---|---|---|---|---|---|---|---|---|---|---|---|---|---|---|---|---|
| Bits 4 | 12 | 1 | 1 | 2 | 2 | 1 | 3 | 1 | 1 | 6 | 2 | 1 | 16 | 1 | 9 | 1 | variable |

1: EHT version

EHT format Common Info

| Trigger Type | UL Length | More TF | CS Required | UL BW | GI And HE-LTF Type | MU-MIMO HE-LTF Mode | Number Of HE-LTF Symbols And Midamble Periodicity | STBC | LDPC Extra Symbol Segment | APTx Power | Pre-FEC Padding Factor | PE Disambiguity | UL Spatial Reuse | Doppler | UL HE-SIG-A2 Reserved | Reserved | Trigger Dependent Common Info |
|---|---|---|---|---|---|---|---|---|---|---|---|---|---|---|---|---|---|
| Bits 4 | 12 | 1 | 1 | 3 | 2 | 1 | 3 | 1 | 1 | 6 | 2 | 1 | 16 | 1 | 9 | 1 | variable |

(51) Int. Cl.
    *H04L 69/22*          (2022.01)
    *H04W 72/232*     (2023.01)
    *H04W 84/12*      (2009.01)

(56)            References Cited

OTHER PUBLICATIONS

Extended European Search Report dated Feb. 28, 2024, for the corresponding European Patent Application No. 21885613.6, 13 pages.
NXP, "Trigger Consideration," Doc.: IEEE 802.11-20/0764rl, May 12, 2020, 10 pages.
Ko et al., "TB PPDU Format Signaling in Trigger Frame," WILUS Inc., IEEE 802.11-20/1192r0, Aug. 6, 2020. (14 pages).
Chu et al., "Trigger Consideration," NXP, IEEE 802.11-20/0764r2, May 12, 2020. (11 pages).
Han et al., "Trigger Frame for Frequency-domain A-PPDU Support," Samsung, IEEE 802.11-20/0831r1, May 20, 2020. (17 pages).
IEEE Computer Society, "Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," 802.11 Working Group, LAN/MAN Standards Committee, IEEE P802.11ax/D7.0, Sep. 2020. (822 pages).
International Search Report, mailed Oct. 12, 2021, for International Patent Application No. PCT/JP2021/026325. (5 pages) (with English translation).
Ko et al., "TB PPDU Format Signaling in Trigger Frame," WILUS Inc., IEEE 802.11-20/1192r1, Aug. 6, 2020. (16 pages).
Shellhammer et al., "Enhanced Trigger Frame for EHT Support," Qualcomm, IEEE 802.11-20/1429r1, Sep. 14, 2020. (20 pages).

* cited by examiner

Trigger frame

User info field

AID12 subfield encoding in HE

| AID12 subfield | Description |
| --- | --- |
| 0 | User Info field allocates one or more contiguous RA-RUs for associated STAs |
| 1–2007 | User Info field is addressed to an associated STA whose AID is equal to the value in the AID12 subfield |
| 2008–2044 | Reserved |
| 2045 | User Info field allocates one or more contiguous RA-RUs for unassociated STAs |
| 2046 | Unallocated RU |
| 2047–4094 | Reserved |
| 4095 | Start of Padding field |

200: TERMINAL

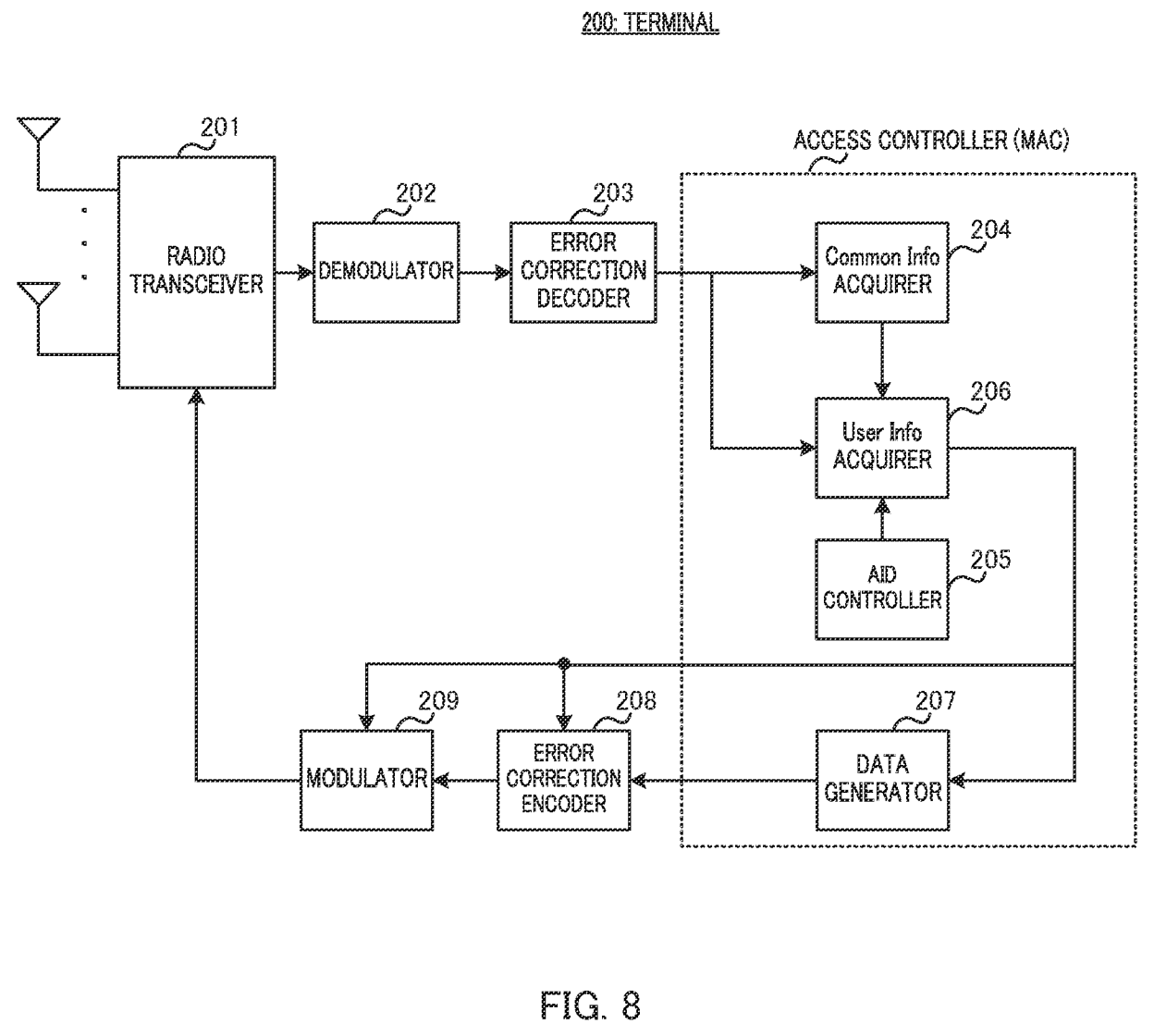

200: TERMINAL

ACCESS CONTROLLER (MAC)

204 Common Info ACQUIRER

206 User Info ACQUIRER

205 AID CONTROLLER

207 DATA GENERATOR

203 ERROR CORRECTION DECODER

202 DEMODULATOR

208 ERROR CORRECTION ENCODER

209 MODULATOR

201 RADIO TRANSCEIVER

FIG. 8

HE format

| AID12 | RU Allocation | UL FEC Coding Type | UL HE-MCS | UL DCM | SS Allocation/ RA-RU Information | UL Target Receive Power | Reserved | Trigger Dependent User Info |
|---|---|---|---|---|---|---|---|---|
| B0 B11 | B12 B19 | B20 | B21 B24 | B25 | B26 B31 | B32 B39 | B39 | |
| 12 | 8 | 1 | 4 | 1 | 6 | 7 | 1 | variable |

Bits:

EHT / EHT+ format

| AID12 | RU Allocation | UL FEC Coding Type | UL HE-MCS | SS Allocation/ RA-RU Information | UL Target Receive Power | Trigger Dependent User Info |
|---|---|---|---|---|---|---|
| 12 | 9 | 1 | 4 | 7 | 7 | variable |

Bits

FIG. 9

Specific AID Table

| Specific AID | HE STA | EHT STA | EHT+ STA |
|---|---|---|---|
| 0 | RA-RU    (For associated terminal) | | |
| 2045 | RA-RU    (For unassociated terminal) | | |
| 2046 | Unallocated RU | | |
| 4095 | Padding start ⇒Stop decoding processing | Common Info in EHT format | |
| 4094 | Undefined (reserved) | Padding start ⇒Stop decoding processing | Common Info in EHT+ format |
| 4093 | Undefined (reserved) | | Padding start ⇒Stop decoding processing |

FIG. 10

Specific AID Table

| Specific AID | HE STA | EHT STA | EHT+ STA |
|---|---|---|---|
| 0 | RA-RU    (For associated terminal) | | |
| 2045 | RA-RU    (For unassociated terminal) | | |
| 4095 | Padding start | | |
| 2046 | Unallocated RU ⇒Stop decoding processing | Common Info in EHT format | |
| 2044 | Undefined (reserved) | Unallocated RU ⇒Stop decoding processing | Common Info in EHT+ format |
| 2043 | Undefined (reserved) | | Unallocated RU ⇒Stop decoding processing |

FIG. 12

Specific AID Table

| Specific AID | HE STA | EHT STA | EHT+ STA |
|---|---|---|---|
| 0 | RA-RU (For associated terminal) | | |
| 2045 | RA-RU (For unassociated terminal) | | |
| 2046 | Unallocated RU | | |
| 4095 | Padding start ⇒Stop decoding processing | Common Info in EHT format | |
| 4094 (First) | Undefined (reserved) | Padding start ⇒Stop decoding processing | Common Info in EHT+ format |
| 4094 (Second) | Undefined (reserved) | | Padding start ⇒Stop decoding processing |

FIG. 14

Specific AID Table

| Specific AID | HE STA | EHT STA | EHT+ STA |
|---|---|---|---|
| 0 | RA-RU (For associated terminal) | | |
| 2045 | RA-RU (For unassociated terminal) | | |
| 2046 | Unallocated RU | | |
| 4095 | Padding start | | |
| 2008 | AID for individual specification | EHT Common Info | |
| 2009 | Undefined (reserved) | RA-RU (For associated terminal) | |
| 2010 | | Unallocated RU | |
| 2011 | AID for individual specification | | EHT+ Common Info |
| 2012 | Undefined (reserved) | | RA-RU (For associated terminal) |
| 2013 | | | Unallocated RU |

FIG. 22

Specific AID Table

| Specific AID | HE STA | EHT STA | EHT+ STA |
|---|---|---|---|
| 0 | RA-RU (For associated terminal) | | |
| 2045 | RA-RU (For unassociated terminal) | | |
| 2046 | Unallocated RU | | |
| 4095 | Padding start | | |
| 2008 | AID for individual specification | EHT Common Info | |
| 2009 | AID for individual specification | | EHT+ Common Info |

FIG. 24

Specific AID Table

| Specific AID | HE STA | EHT STA | EHT+ STA |
|---|---|---|---|
| 0 | RA-RU (For associated terminal) | | |
| 2045 | RA-RU (For unassociated terminal) | | |
| 2046 | Unallocated RU | | |
| 4095 | Padding start | | |
| 2007 | AID for individual specification | EHT Common Info | |
| 2009 | Undefined (reserved) | RA-RU (For associated terminal) | |
| 2010 | | Unallocated RU | |
| 2006 | AID for individual specification | | EHT+ Common Info |
| 2012 | Undefined (reserved) | | RA-RU (For associated terminal) |
| 2013 | | | Unallocated RU |

FIG. 26

Specific AID Table

| Specific AID | HE STA | EHT STA | EHT+ STA |
|---|---|---|---|
| 0 | RA-RU  (For associated terminal) | | |
| 2045 | RA-RU  (For unassociated terminal) | | |
| 2046 | Unallocated RU | | |
| 4095 | Padding start | | |
| 2007 | AID for individual specification | EHT Common Info | |
| 2006 | AID for individual specification | | EHT+ Common Info |

FIG. 28

COMMUNICATION DEVICE AND COMMUNICATION METHOD

TECHNICAL FIELD

The present disclosure relates to a communication apparatus and a communication method.

BACKGROUND ART

In The Institute of Electrical and Electronics Engineers (IEEE), studies have been carried out on the IEEE 802.11be standard (hereinafter also referred to as "11be") for the next generation radio Local Area Network (LAN), which is the successor to the IEEE 802.11ax standard (hereinafter also referred to as "11ax"). The IEEE 802.11ax is also referred to as "High Efficiency (HE)," and the IEEE 802.11be is also referred to as "Extremely High Throughput (EHT)."

CITATION LIST

Non Patent Literatures

NPL 1
IEEE P802.11ax/D7.0, 2020-09
NPL 2
802.11-20/0764r2, Trigger Consideration, 2020-05
NPL 3
802.11-20/0831r1, Trigger Frame for Frequency-domain A-PPDU Support, 2020-05
NPL 4
802.11-20/1429r1, Enhanced Trigger Frame for EHT Support, 2020-09

SUMMARY OF INVENTION

However, there is room for study on a format of a control signal that indicates uplink transmission, which can reduce a reception processing amount in a terminal.

A non-limiting and exemplary embodiment facilitates providing a communication apparatus and a communication method each capable of reducing a reception processing amount in a terminal, in accordance with a format of a control signal that indicates uplink transmission.

A communication apparatus according to an exemplary embodiment of the present disclosure includes: circuitry, which, in operation, configures a first value to an association ID (AID) 12 subfield of a first field of a trigger frame that requests an Extremely High Throughput (EHT) trigger-based (TB) physical-layer protocol data unit (PPDU); and a transmitter, which in operation, transmits the trigger frame, in which the first value indicates that the first field includes information commonly used for transmission of the EHT TB PPDU.

It should be noted that general or specific embodiments may be implemented as a system, an apparatus, a method, an integrated circuit, a computer program, a storage medium, or any selective combination thereof.

According to an exemplary embodiment of the present disclosure, it is possible to reduce a reception processing amount in a terminal, in accordance with a format of a control signal that indicates uplink transmission.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 4 illustrates examples of a value that is configured to an Association ID (AID) 12 subfield of the User info field and description thereof;

FIG. 8 is a block diagram illustrating an exemplary configuration of the terminal;

FIG. 9 illustrates an exemplary User Info field in an EHT/EHT+ format, in comparison in an HE format;

FIG. 10 illustrates an exemplary Specific AID table in Operation Example 1-1;

FIG. 12 illustrates an exemplary Specific AID table in Operation Example 1-2;

FIG. 14 illustrates an exemplary Specific AID table in Operation Example 1-3;

FIG. 22 illustrates an exemplary Specific AID table in Operation Example 2-2;

FIG. 24 illustrates an exemplary Specific AID table in Operation Example 2-3;

FIG. 26 illustrates an exemplary Specific AID table in Operation Example 2-4;

FIG. 28 illustrates an exemplary Specific AID table in Operation Example 2-5;

DESCRIPTION OF EMBODIMENTS

Hereinafter, embodiments of the present disclosure will be described in detail with reference to the accompanying drawings.

Embodiment 11

In 11ax, the introduction of uplink Orthogonal Frequency-Division Multiple Access (OFDMA) has been specified. An access point (i.e., AP which may be referred to as "base station") transmits, to a plurality of terminals ("STAs (Stations)") under the coverage of the AP, a control signal (e.g., "Trigger frame") indicating the transmission of an uplink OFDMA signal. The term "indicate" may be replaced with the term "instruct."

Figure 1:
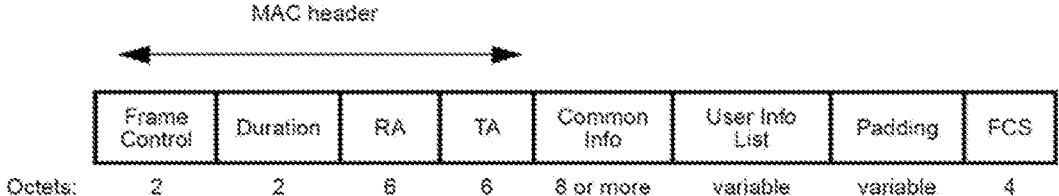
FIG. 1 illustrates an exemplary format of a Trigger frame.
Figure 2:
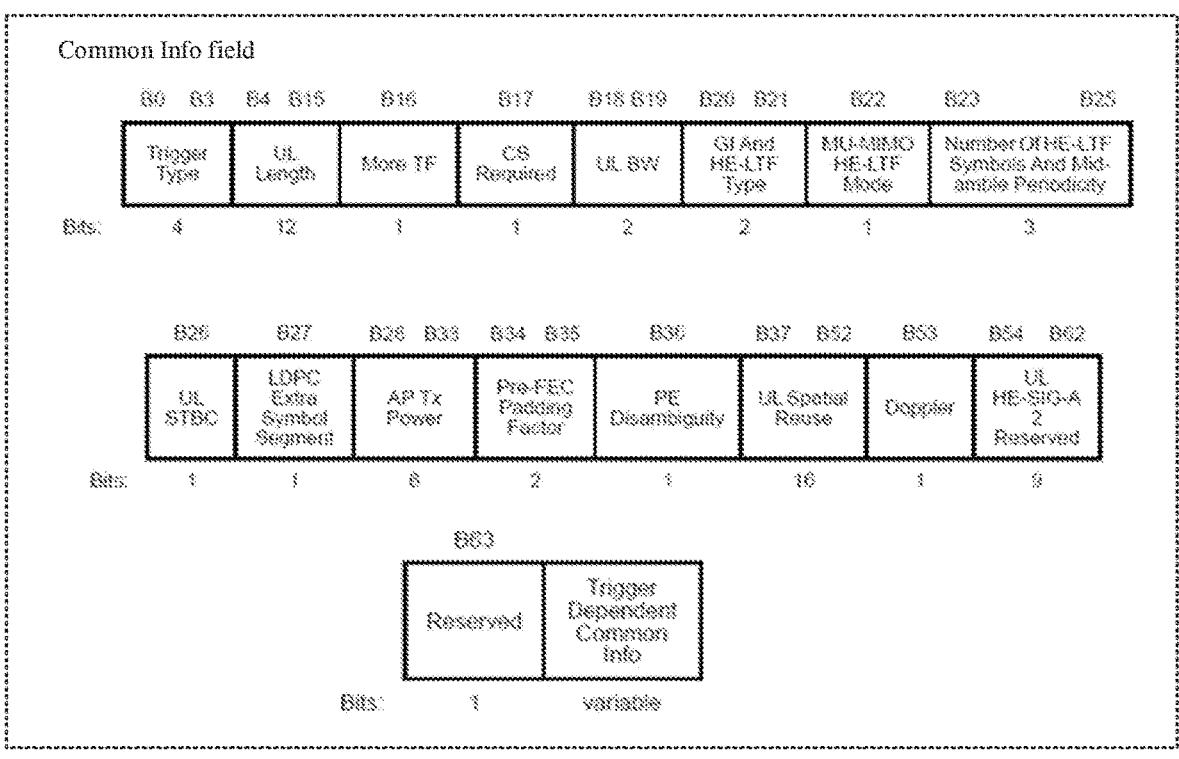
FIG. 2 illustrates an exemplary format of a Common info field.
Figure 3:
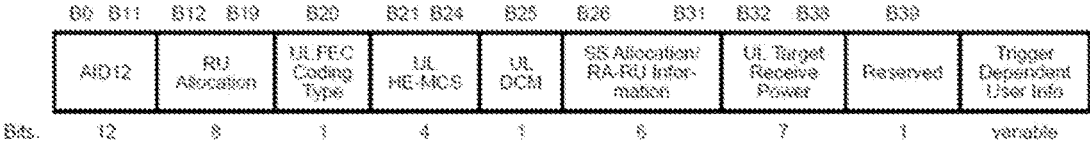
FIG. 3 illustrates an exemplary format of a User info field.

For example, as illustrated in FIG. 1, for a Trigger frame, a Common Info field and a User Info List field are defined (e.g., see Non-Patent Literature (hereinafter referred to as "NPL") 1). The common Info field includes information that is common to a plurality of HE terminals (11ax terminals) to be multiplexed by OFDMA. The user Info List field includes one or a plurality of User Info fields, and a User Info field may include information specific for each of the HE terminals to be multiplexed by OFDMA. FIG. 2 illustrates an exemplary configuration of the Common Info field, and FIG. 3 illustrates an exemplary configuration of the User Info field (e.g., see NPL 1).

An AID12 subfield of the User Info field is used for indication of an Association ID (AID), which is an ID specific for a terminal and is assigned to the terminal at the time of association, for example. The current IEEE 802.11 standard uses values from 1 to 2007 as the AID, while other values are unused (reserved) as the AID. In the following, a method for allocating a frequency resource (RU: Resource Unit) to a particular terminal by indicating the AID assigned to the terminal is referred to as "individually specified RU (Individually addressed RU)." Transmission using the individually addressed RU is sometimes referred to as a Scheduled access.

Further, in 11ax, as illustrated in FIG. 4, for example, a particular AID (hereinafter, sometimes referred to as "Specific AID"), which is selected from AIDs not used for the individually addressed RU (hereinafter sometimes referred to as "unused AID" or "reserved AID"), is used as a value of the AID12 subfield in order to indicate an RU other than the individually addressed RU.

By way of example, when AID=0 or AID=2045 that is the Specific AID is configured as the value of the AID12 subfield, it is indicated, to the terminal, that an RU indicated by an RU Allocation subfield, which is RU allocation information of the User Info field, is an RU for a Random Access (hereinafter sometimes referred to as "RA-RU") (e.g., see NPL 1). Alternatively, when AID=2046 is configured as the Specific AID, it is indicated, to the terminal, that an RU indicated by the RU Allocation subfield of the User Info field is a non-allocated RU (sometimes referred to as Unallocated RU or Unassigned RU).

Even in 11be (EHT) and the beyond 11be, which is a further next-generation version (hereafter sometimes described as "EHT+"), reuse of a Trigger frame of 11ax (HE) has been discussed, as a control signal indicating transmission of an uplink OFDMA signal to a plurality of terminals (e.g., see NPLs 2, 3, and 4).

In EHT, the following three requirements have been studied as anew Trigger frame for EHT. The first requirement is that a single Trigger frame can indicate a combination of an HE terminal, an EHT terminal, and an EHT+ terminal. The second requirement is Backward compatibility, that is, a new Trigger frame has no effect on an operation of an HE terminal (e.g., HE terminal can receive the new Trigger frame). The third requirement is Forward compatibility, that is, a new Trigger frame is easily enhanced toward EHT+.

There is room for study on, however, a method for transmitting anew Trigger frame taking into account a reception processing amount of a terminal and overhead of the Trigger frame, in addition to the above-mentioned requirements. Moreover, there is room for study also on an arrangement order of an individually addressed RU, an RA-RU, and an unallocated RU.

In the following, a description will be given of an efficient Trigger frame transmission method taking into account a reception processing amount of a terminal and overhead of a control signal, in addition to the above-mentioned requirements to a new Trigger frame.

[Configuration of Radio Communication System]

A radio communication system according to Embodiment 1 includes AP 100 and terminal 200. AP 100 and terminal 200 are each examples of a radio communication apparatus. Moreover, AP 100 may be regarded as an example of a radio transmission apparatus, and terminal 200 may be regarded as an example of a radio reception apparatus.

In one example, AP 100 transmits, to terminal 200, a Trigger frame indicating transmission of an uplink signal (may be referred to as "uplink transmission"). Terminal 200 receives the Trigger frame and then transmits, to AP 100, an uplink signal (e.g., OFDMA signal) by using a resource indicated by the Trigger frame, for example. The uplink signal transmitted by terminal 200 may include, for example, a signal such as a data signal or an RA signal.

Here, terminal 200 may be any of an HE terminal, an EHT terminal, and an EHT+ terminal. AP 100 may transmit one Trigger frame to a plurality of terminals with different versions (sometimes each referred to as "terminal version") and may receive an uplink signal from each of terminals 200, for example. AP 100 separates, from the received signal, and decodes the uplink signal of each of terminals 200 that is mapped in the resource allocated to each of terminals 200. Note that AP 100 may be, for example, an AP that supports EHT or EHT+, in addition to HE.

Figure 5:
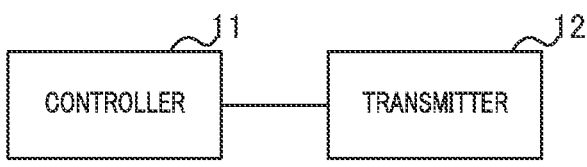
FIG. 5 is a block diagram illustrating an exemplary partial configuration of an access point (AP)
Figure 6:
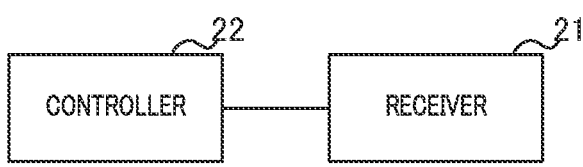
FIG. 6 is a block diagram illustrating an exemplary partial configuration of a terminal.

FIG. 5 is a block diagram illustrating an exemplary partial configuration of AP 100 according to the present embodiment, and FIG. 6 is a block diagram illustrating an exemplary partial configuration o of terminal 200 according to the present embodiment.

In AP 100 illustrated in FIG. 5, controller (or control circuitry) 11 generates a control signal (e.g., Trigger frame) that indicates, to terminal 200, transmission of an uplink signal, for example. A transmitter (or transmission circuitry) 12 transmits the control signal (Trigger frame), for example.

Processing performed by controller 11 (e.g., generation of control signal) may include performing association, in accordance with a terminal version, between information on a format of a terminal information field for the control signal indicating the transmission of the uplink signal on one hand, and identification information that is unused for terminal identification information to be assigned to a terminal to be individually specified (hereinafter may also be referred to as "individually-specified terminal") on the other hand.

By way of example, controller 11 may, in a Trigger frame, configure a particular ID (Specific AID) that is selected from unused IDs not used for a terminal ID to be assigned to the individually-specified terminal. This Specific AID may be associated with a definition (or may be given meaning) regarding the format of the terminal information field (or may be referred to as "user information field"). Controller 11 may make a meaning of the Specific AID different in accordance with a terminal version, for example. In other words, an interpretation of the Specific AID by terminal 200 may be made different in accordance with a terminal version.

Meanwhile, in terminal 200 illustrated in FIG. 6, receiver (or reception circuitry) 21 receives a control signal (e.g., Trigger frame) that indicates, to terminal 200, transmission of an uplink signal, for example.

Controller (or control circuitry) 22 transmits the uplink signal based on the control signal indicating the transmission of the uplink signal. Further, controller 22 determines which terminal information field to receive, based on the association of information on a format of a terminal information field in the control signal indicating the transmission of the uplink signal on one hand, and identification information that is unused for terminal identification information to be assigned to an individually-specified terminal on the other hand, for example. Receiver 21 performs reception processing on the determined terminal information field.

For example, controller 22 interprets, based on the Specific AID detected in the Trigger frame, a definition of the format of the terminal information field, and receiver 21 performs the reception processing in accordance with the interpretation.

[Configuration of AP]

Figure 7:
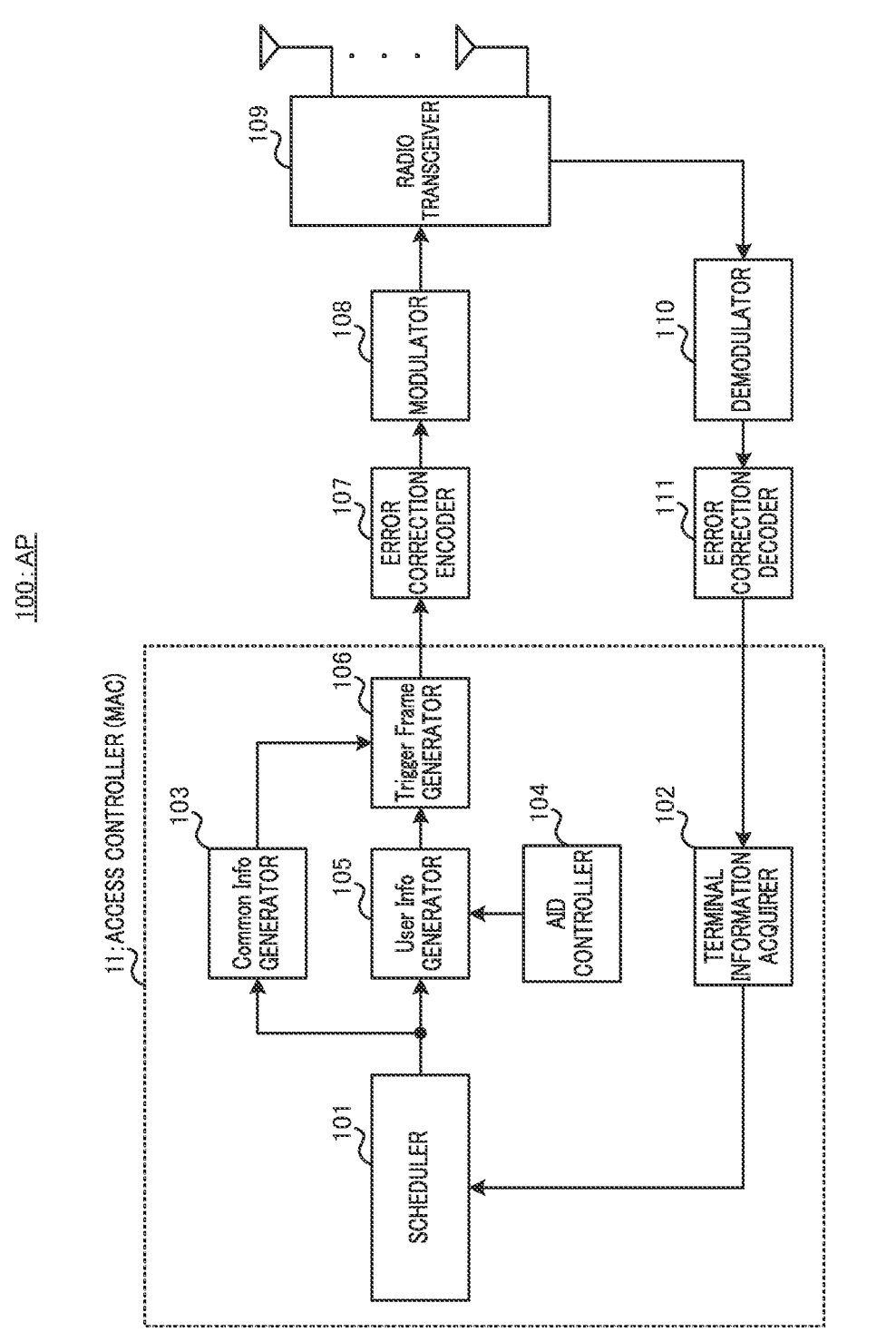
FIG. 7 is a block diagram illustrating an exemplary configuration of the AP.

FIG. 7 is a block diagram illustrating an exemplary configuration of AP 100 according to the present embodiment. As illustrated in FIG. 7, AP 100 may include, for example, scheduler 101, terminal information acquirer 102, Common Info generator 103, AID controller 104, User Info generator 105, Trigger frame generator 106, error correction encoder 107, modulator 108, radio transceiver 109, demodulator 110, and error correction decoder 111.

Incidentally, some or all of scheduler 101, terminal information acquirer 102, Common Info generator 103, AID controller 104, User Info generator 105, and Trigger frame generator 106 may configure an access controller (Medium Access Control, MAC) (e.g., corresponding to controller 11 of FIG. 5), for example. Further, radio transceiver 109 may correspond to transmitter 12 of FIG. 5, for example.

Scheduler 101 determines a radio resource of an uplink signal of each terminal 200 and a format of a User Info field to be applied, based on terminal information (e.g., information such as version of terminal and radio quality per predetermined band) output from terminal information acquirer 102, for example. The radio resource of the uplink signal may include, for example, information or a parameter such as an allocation band, a modulation scheme and an encoding rate (MCS: Modulation and Codding Scheme), and a target reception level. Further, the radio resource information for terminal 200 and the format of the User Info field that have been determined by scheduler 101 are output to User Info generator 105 and Common Info generator 103, for example.

Common Info generator 103 generates a Common Info field by reusing the HE format illustrated in FIG. 2 and outputs the resultant field to Trigger frame generator 106, for example. The size of Common Info field may be the same as that of the HE format, for example. The Backward compatibility can be thus ensured. Here, for an EHT and/or an EHT+ terminal, AP 100 may indicate, to terminal 200, information by using a reserved field of the Common Info (to be described in detail later).

AID controller 104 holds information that defines interpretations of a Specific AID and a User info field for each terminal version (e.g., table (hereinafter sometimes referred to as "Specific AID table"), and outputs the Specific AID table to User Info generator 105, for example. The Specific AID table may be defined as a standard. Further, part of the Specific AID table may be determined for each AP 100 and indicated to terminal 200 to be associated.

User Info generator 105 generates a User Info List to which one or more User Info fields are arranged and outputs the list to Trigger frame generator 106. The User Info field may have the same size as the HE format illustrated in FIG. 3, for example. The Backward compatibility can be thus ensured. Further, in addition to the HE format (may also be referred to as HE-specific User Info field) illustrated in FIG. 3, an EHT/EHT+ format that is newly defined for EHT/EHT+(may also be referred to as EHT-specific User Info field and/or EHT+-specific User Info field) may be applied to the User info field. Incidentally, the symbol "/" in a notation such as "A/B" refers to "and/or" or "at least one of (A and B)".

The EHT format and the EHT+ format may each be, for example, a format that includes a field (Common Info field) including information shared between terminals 200 (Common info) and a field (User Info field) including individual information for terminal 200 (User Info), as well as HE.

For the purpose of indicating identification information on these formats to an EHT/EHT+ terminal, User Info generator 105 generates, based on the definition of the Specific AID table from AID controller 104, a User info field including the Specific AID, and User Info fields to which the formats are respectively applied, for example. Some of the values of the Specific AID (e.g., 2045) may be used to represent a special User Info field including common information for EHT/EHT+ (may also be referred to as EHT-specific common information and/or EHT+-specific common information), and the special User Info field may be used as a delimiter to indicate placement of the User Info field for EHT/EHT+. Terminal 200 of EHT/EHT+ holds the same Specific AID table as that of AP 100 and uses the definition of the Specific AID table to interpret format definitions of the User Info fields in the received Trigger frame (escribed in detail later), for example.

Here, in the Common Info field to which the EHT/EHT+ format is applied may include a UL BW subfield (uplink transmission bandwidth), for example. HE supports up to 160 MHz of bandwidth, whereas EHT may support up to 320 MHz of bandwidth for example. Hence, EHT/EHT+ terminal 200 may acquire the uplink transmission bandwidth from, in addition to (or instead of) the UL BW subfield included in the Common Info field in the HE format, the UL BW subfield included in the Common information in the EHT/EHT+ format included in the User info field. Incidentally, the term "acquire" may be interchangeably replaced with, for example, the term such as "recognize," "grasp," "identify, or "specify."

Further, the User info field to which the EHT/EHT+ format is applied may change the size of RU allocation subfield (information on uplink transmission band position and bandwidth), as compared with the HE format. For example, in the User info field addressed to EHT/EHT+ terminal 200, an RU allocation subfield in the EHT/EHT+ format may be made larger in size than an RU allocation subfield (eight bits) in the HE format in order to indicate the range up to 320 MHz.

Trigger frame generator 106 generates a Trigger frame by adding, in accordance with the format illustrated in FIG. 1, a MAC header. Padding, a frame check sequence (FCS) to a set of the Common Info field from Common Info generator 103 and the User Info List (multiple User Info fields) from User Info generator 105, for example. The generated Trigger frame is output to error correction encoder 107, for example.

Error correction encoder 107 receives a transmission data signal including the Trigger frame as input, performs error-correction encoding on the input signal, and outputs the encoded signal to modulator 108, for example.

Modulator 108 performs modulation processing on the signal input from error correction encoder 107 and outputs the modulated data signal to radio transceiver 109, for example. Incidentally, in a case where the modulated data signal is an orthogonal frequency division multiplexing (OFDM) signal, AP 100 (e.g., modulator 108) maps the modulated signal to a predetermined frequency resource, performs Inverse Fast Fourier Transform (IFFT) processing for conversion into a time waveform, adds a cyclic prefix (CP), and thereby may form the OFDM signal.

Radio transceiver 109 applies radio transmission processing such as digital to analog (D/A) conversion and up-conversion to a carrier frequency on the modulated signal output from modulator 108, and transmits the signal after the radio transmission processing to terminal 200 via antennae. Also, radio transceiver 109 receives the signal transmitted from terminal 200 via the antennae, applies radio reception processing such as down-conversion to a baseband and analog to digital (A/D) conversion on the received signal, and outputs the signal after the radio reception processing to demodulator 110.

Demodulator 110 performs demodulation processing on the input signal and outputs the resulting signal to error correction decoder 111, for example. Incidentally, in a case where the input signal is an OFDM signal, AP 100 (e.g., demodulator 110) may apply CP removal processing and Fast Fourier transform (FFT) processing on the OFDM signal.

Error correction decoder 111 decodes the signal input from demodulator 110 and thus acquires a received data signal from terminal 200, for example. In a case where the decoded received data includes the above-mentioned terminal information, the terminal information is output to terminal information acquirer 102, for example.

[Configuration of Terminal]

FIG. 8 is a block diagram illustrating an exemplary configuration of terminal 200 according to the present embodiment. Terminal 200 illustrated in FIG. 8 may include, for example, radio transceiver 201, demodulator 202, error correction decoder 203, Common Info acquirer 204, AID controller 205, User Info acquirer 206, data generator 207, error correction encoder 208, and modulator 209.

Incidentally, some or all of Common Info acquirer 204, AID controller 205, User Info acquirer 206, and data generator 207 may configure an access controller (MAC) (e.g., corresponding to controller 22 of FIG. 6), for example. Further, radio transceiver 201 may correspond to receiver 21 of FIG. 6, for example.

Radio transceiver 201 receives the received signal by the antennae, performs radio reception processing such as down-conversion and A/D conversion on the received signal, and thus outputs the resulting received signal to demodulator 202, for example.

Demodulator 202 performs demodulation processing on the received signal input from radio transceiver 201 and outputs the demodulated signal to error correction decoder 203, for example. Incidentally, in a case where the input signal is an OFDM signal, terminal 200 (e.g., demodulator 202) may apply CP removal processing and FFT processing on the OFDM signal, for example.

Error correction decoder 203 decodes the demodulated signal input from demodulator 202 and outputs the decoded signal as a received data signal, for example. Further, error correction decoder 203 outputs, of the received data signal, a Trigger frame to Common info acquirer 204 and User Info acquirer 206, for example.

Common Info acquirer 204 extracts information on a Common Info field from the Trigger frame output from error correction decoder 203 and thus acquires terminal-common information (e.g., information such as data type to be transmitted and time length of uplink signal time) for generation of an uplink signal, for example. The acquired terminal-common information is output to User Info acquirer 206, for example.

AID controller 205 may operate in the same manner as AID controller 104 in AP 100, for example. In one example, AID controller 205 may output, to User Info acquirer 206, the Specific AID table that defines the interpretations of the Specific AID and the User info field for each terminal version.

User Info acquirer 206 extracts a User info List (multiple User Info fields) from the Trigger frame output from Common info acquirer 204 and performs reception processing on the User Info fields in an arrangement order, while determining the format of each of the User info fields by using the Specific AID table from AID controller 205, for example. When it is determined that an individually addressed RU or an RA-RU is allocated, User Info acquirer 206 outputs, to data generator 207, the terminal-common information and terminal-individual information used for data generation, for example.

For example, User Info acquirer 206 compares the AID of terminal 200 assigned by AP 100 at the time of association and the AID included in an AID12 subfield of a User info field, and when these AIDs match with each other, User Info acquirer 206 may determine that an individually addressed RU has been assigned by AP 100. In accordance with this determination, terminal 200 performs, based on the format of the User info field, reception processing on the remaining terminal-specific information (e.g., information such as RU arrangement information, MCS, spatial multiplex information, and uplink target power information) used for the generation of the uplink signal, for example.

When an access occasion is acquired by the AID indicating an RA-RU (e.g., 0 or 2045) even in a situation where the AIDs do not match, for example, terminal 200 may perform, based on the predetermined format, reception processing on the remaining terminal-specific information (e.g., information such as RU arrangement information, MCS, and uplink target power information) used for generation of an uplink random access signal. Meanwhile, when detecting the AID indicating an unallocated RU, for example, terminal 200 may stop receiving subsequent User info fields. Moreover, when detecting the AID indicating a Padding start, for example, terminal 200 may stop receiving subsequent subfields.

Data generator 207 generates data of a predetermined type and a predetermined size, based on the terminal-common information and the terminal-individual information from User Info acquirer 206, and outputs the generated data to error correction encoder 208, for example.

Error correction encoder 208 receives the data signal from data generator 207 as input, performs error-correction encoding on the transmitted data, based on the terminal-common information and the terminal-individual information from User Info acquirer 206, and then outputs the encoded signal to modulator 209, for example.

Modulator 209 modulates the signal input from error correction encoder 208 and outputs the modulated signal to radio transceiver 201, based on the terminal-common information and the terminal-individual information from User Info acquirer 206, for example. When the modulated signal is an OFDM signal, terminal 200 (e.g., modulator 209) may form the OFDM signal by mapping the modulated signal to a frequency resource, performing IFFT processing after the mapping, and adding the CP.

Radio transceiver 201 applies radio transmission processing such as up-conversion and D/A conversion to the input signal from modulator 209 and transmits the signal after the radio transmission processing from antennae.

<Operations of AID Controller 205 and User Info Acquirer 206>

Hereinafter, descriptions will be given of an exemplary Specific AID table generated in AID controller 205 of terminal 200 and an exemplary format-determination method of a User Info field in User Info acquirer 206 by using the Specific AID table.

The Specific AID table held by AID controller 205 indicates, for example, that a definition of the terminal information field that is associated with the "Specific AID," which is a particular ID selected from unused IDs not used for the terminal ID to be assigned to individually-specified terminal 200, is changed in accordance with a terminal version, such as HE, EHT, or EHT.

Using the Specific AID table achieves reductions in the reception processing amount of terminal 200 and overhead of the Trigger frame, in addition to the three requirements mentioned above (e.g., to indicate combination of HE terminal, EHT terminal, and EHT+ terminal with single Trigger frame, to ensure Backward compatibility, and to ensure Forward compatibility).

Incidentally, setting the Specific AIDs (0, 2045, 2046, and 4095) that are defined in HE exemplified in FIG. 4 to have different meanings in EHT and EHT+ eliminates the need to introduce a new Specific AID, which can reduce the consumption of unused AIDs. Therefore, the scalability for the future systems can be maintained.

Here, an exemplary User Info field in an EHT/EHT+ format is illustrated at the lower section of FIG. 9, in comparison in an HE format. Compared with a User Info field in an HE format (the same as in FIG. 3) illustrated in the upper section of FIG. 9, in the User Info field of the EHT/EHT+ format, the size of RU allocation subfield may be extended (e.g., extension by one bit from eight bits to nine bits). This extension makes it possible to cope with an increase in range of the supportable allocation band (e.g., extension from 160 MHz to 320 MHz).

Meanwhile, in EHT, the presence or absence of application of Dual subCarrier Modulation (DCM) may be included in a MCS table. Therefore, a UL DCM subfield (one bit) illustrated in the upper section of FIG. 9 may be deleted as illustrated in the lower section of FIG. 9. Further, in EHT+, the maximum value of the number of supportable Spatial streams (SSs) may be extended (e.g., increased from 8 to 16). Therefore, as illustrated in the lower section of FIG. 9, the size of a SS Allocation/RA-RU Information subfield may be extended (increased) by one bit from six bits to seven bits. In addition, Reserved (one bit) illustrated in the upper section of FIG. 9 may be deleted in the lower section of FIG. 9. This allows the size of User Info field to match with the size of HE format, thus ensuring the Backward compatibility.

Next, a non-limiting example will be described below in which a relation (may be replaced with "association" or "meaning") between a Specific AID and a definition of a User Info field format including the Specific AID is made different in accordance with a terminal version.

Operation Example 1-1

FIG. 10 illustrates an exemplary Specific AID table in Operation Example 1-1. In FIG. 10, by way of non-limiting example, new AIDs=4094 and 4093 may be each defined as a Specific AID. In FIG. 10, "undefined (reserved)" means not defined as a Specific AID. Specific AIDs (0, 2045, and 2046) that are specified or defined in HE may have the same meaning also for EHT/EHT+ terminal 200. On the other hand, Specific AID=4095 is given a different meaning between HE terminal 200 and EHT/EHT+ terminal 200. For terminals 200 of respective generations of HE/EHT/EHT+, a value that is not defined as an AID or a Specific AID may be ignored as undefined (reserved), but may be defined as a Specific AID in further future generations.

When detecting AID=4095, HE terminal 200 may make an interpretation as a Padding start, based on the HE specification, and may stop the reception processing on subsequent bit information. When making an interpretation as the Padding start, HE terminal 200 assumes that there is no information in and after an AID12 subfield of the User Info field, i.e., all the bits for the information in and after the subfield are one till the end, and thus need not take into account a delimiter of the User Info field after the AID12 subfield.

In contrast, when detecting AID=4095, EHT/EHT+ terminal 200 may interpret the User Info field in which AID=4095 is detected as in a format of Common Info for EHT, for example. In other words, EHT/EHT+ terminal 200 may interpret the bit information subsequent to the AID12 subfield as extended signaling indicating the format of the Common Info for EHT. Thus, for the purpose of indicating common information, the Trigger frame for EHT may use, in addition to (or instead of) the Common Info field, part of the User Info field having a Specific AID. A special User Info field used for this purpose is also referred to as an extended Common Info field, and an extended Common Info field having AID=4095 is also referred to as an extended Common Info field for EHT.

In addition, when detecting AID=4094, HE terminal 200 need not perform a particular process. For example, since the Padding start is indicated to HE terminal 200 by the previously received User Info field (AID=4095), it is assumed that HE terminal 200 does not detect AID=4094.

In contrast, when detecting AID=4094, EHT terminal 200 may interpret the User Info field in which AID=4094 is detected as the Padding start and may stop the reception processing on subsequent bit information. Further, when detecting AID=4094, EHT+ terminal 200 may interpret the User Info field in which AID=4094 is detected as in a format of extended Common Info for EHT+, for example. In other words, EHT+ terminal 200 may interpret the bit information subsequent to the AID12 subfield (AID=4094) as extended signaling indicating the format of the Common Info for EHT+.

In addition, when detecting AID=4093, HE/EHT terminal 200 need not perform a particular process. Since the Padding start is indicated to HE/EHT terminal 200 by the previously received User Info field (AID=4095 or 4094), it is assumed that HE/EHT terminal 200 does not detect AID=4093. In contrast, when detecting AID=4093, EHT+ terminal 200 may interpret the User Info field in which AID=4093 is detected as the Padding start and may stop the reception processing on subsequent bit information.

Note that contents of a Specific AID table is not limited to the example illustrated in FIG. 10. For example, changing a meaning of a format-definition of a User Info field for a Specific AID into a different meaning from that of FIG. 10 makes it possible to flexibly indicate the User Info field subject to the reception processing for each terminal 200 with different terminal versions. This applies for Specific AID tables in other operation examples described later.
(Arrangement Example for User Info List)

Figure 11:
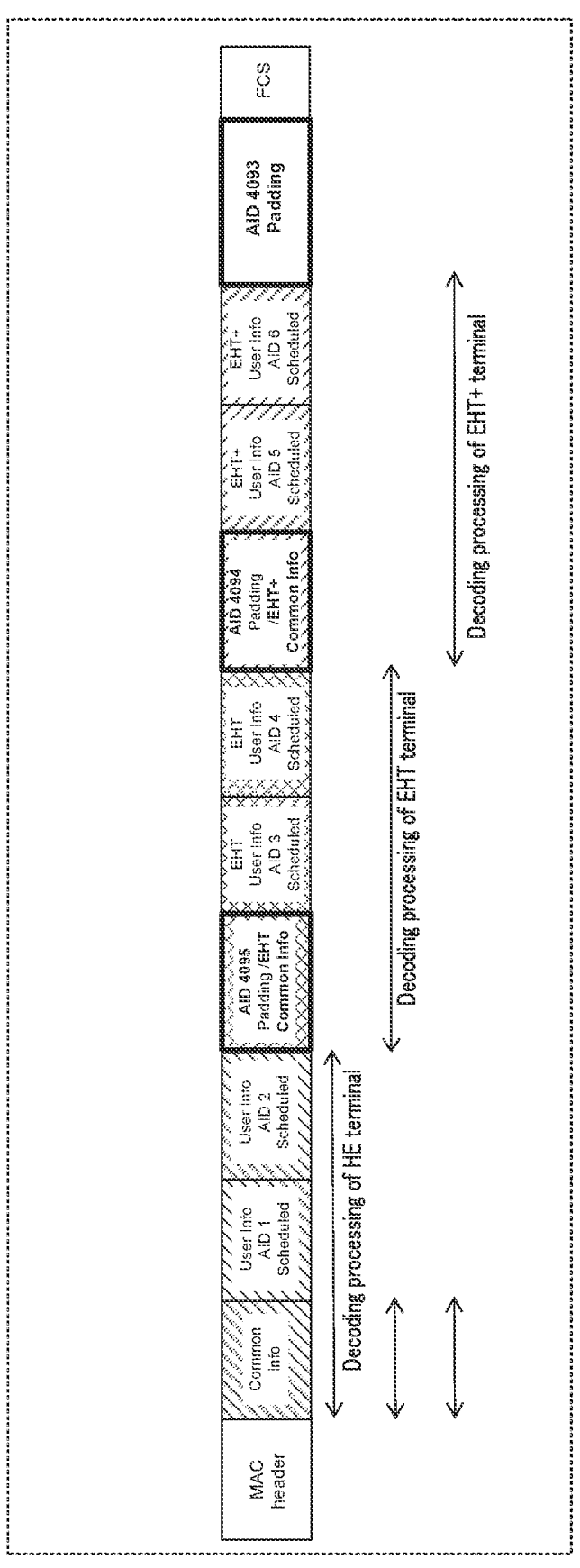
FIG. 11 illustrates an arrangement example for a User info List in Operation Example 1-1.

FIG. 11 illustrates an arrangement example for a User info List in Operation Example 1-1. As illustrated in FIG. 11, User Info formats for HE are arranged in User Info fields between a Common Info format for HE and an extended Common Info format for EHT (i.e., Padding start for EHT indicated by AID=4095).

User Info formats for EHT are arranged in User Info fields between the extended Common Info format for EHT and an extended Common Info format for EHT+(i.e., Padding start for EHT indicated by AID=4094). Similarly, User Info formats for EHT+ are arranged in User Info fields between the extended Common Info format for EHT+ and a Padding start for EHT+(AID=4093).

Such arrangement allows a single Trigger frame to indicate, for a combination of terminals 200 with different versions, the format in accordance with a terminal version, thereby satisfying the requirements of the Backward compatibility and the Forward compatibility.

In addition, as illustrated in FIG. 11, since the User Info field to be received can be distinguished by each terminal version, the reception processing amount of terminal 200 can be reduced. Further, the User Info field indicating the Padding start for each terminal version is also used for indication of Common Info for a different terminal version, and thus, the Trigger frame overhead can be suppressed.

As for a Common Info field for HE (see, for example, FIG. 2), all of HE/EHT/EHT+ terminals 200 receives it regardless of the difference in terminal version. EHT/EHT+ terminal 200 may overwrite the Common Info for HE with information included in the extended Common Info field for EHT/EHT+(e.g., information such as UL BW).

Operation Example 1-2

FIG. 12 illustrates an exemplary Specific AID table in Operation Example 1-2. In FIG. 12, by way of non-limiting example, new AIDs=2044 and 2043 may be each defined as a Specific AID. In FIG. 12. "undefined (reserved)" means not defined as a Specific AID. Specific AIDs (0, 2045, and 4095) that are specified or defined in HE may have the same meaning also for EHT/EHT+ terminal 200. On the other hand, Specific AID=2046 is given a different meaning between HE terminal 200 and EHT/EHT+ terminal 200. For terminals 200 of respective generations of HE/EHT/EHT+, a value that is not defined as an AID or a Specific AID may be ignored as undefined (reserved), but may be defined as a Specific AID in further future generations.

When detecting AID=2046, HE terminal 200 may interpret that as unallocated-RU indication and may stop the reception processing on subsequent User Info fields. In a case where it is interpreted as the unallocated-RU indication, subfields other than an RU Allocation subfield are reserved, and thus, HE terminal 200 may stop the reception processing on the subsequent User Info fields.

In contrast, when detecting AID=2046, EHT/EHT+ terminal 200 may interpret the User Info field in which AID=2046 is detected as in a format of an extended Common Info field for EHT, for example. In other words, EHT/EHT+ terminal 200 changes the interpretation of the meaning of the User Info field with the AID12 subfield.

In addition, when detecting AID=2044 or AID=2043, HE terminal 200 need not perform a particular process. Since the unallocated-RU indication is indicated to HE terminal 200 by the previously received User Info field (AID=2046), it is assumed that HE terminal 200 does not detect AID=2044 or AID=2043.

In contrast, when detecting AID=2044, EHT terminal 200 may interpret the User Info field in which AID=2044 is detected as the unallocated-RU indication and may stop the reception processing on subsequent User Info fields. Further, when detecting AID=2044, EHT+ terminal 200 may interpret the User Info field in which AID=2044 is detected as in a format of an extended Common Info field for EHT+. In other words, EHT+ terminal 200 may change the interpretation of the meaning of the User Info field itself with the AID12 subfield (AID=2044).

In addition, when detecting AID=2043, HE/EHT terminal 200 need not perform a particular process. Since the unallocated-RU indication is indicated to HE/EHT terminal 200 by the previously received User Info field (AID=2046 or 2044), it is assumed that HE/EHT terminal 200 does not detect AID=2043. In contrast, when detecting AID=2043, EHT+ terminal 200 may interpret the User Info field in which AID=2043 is detected as the unallocated-RU indication and may stop the reception processing on subsequent User Info fields.

Operation Example 1-2 described above provides a similar effect as in Operation Example 1-1.
(Arrangement Example for User Info List)

Figure 13:
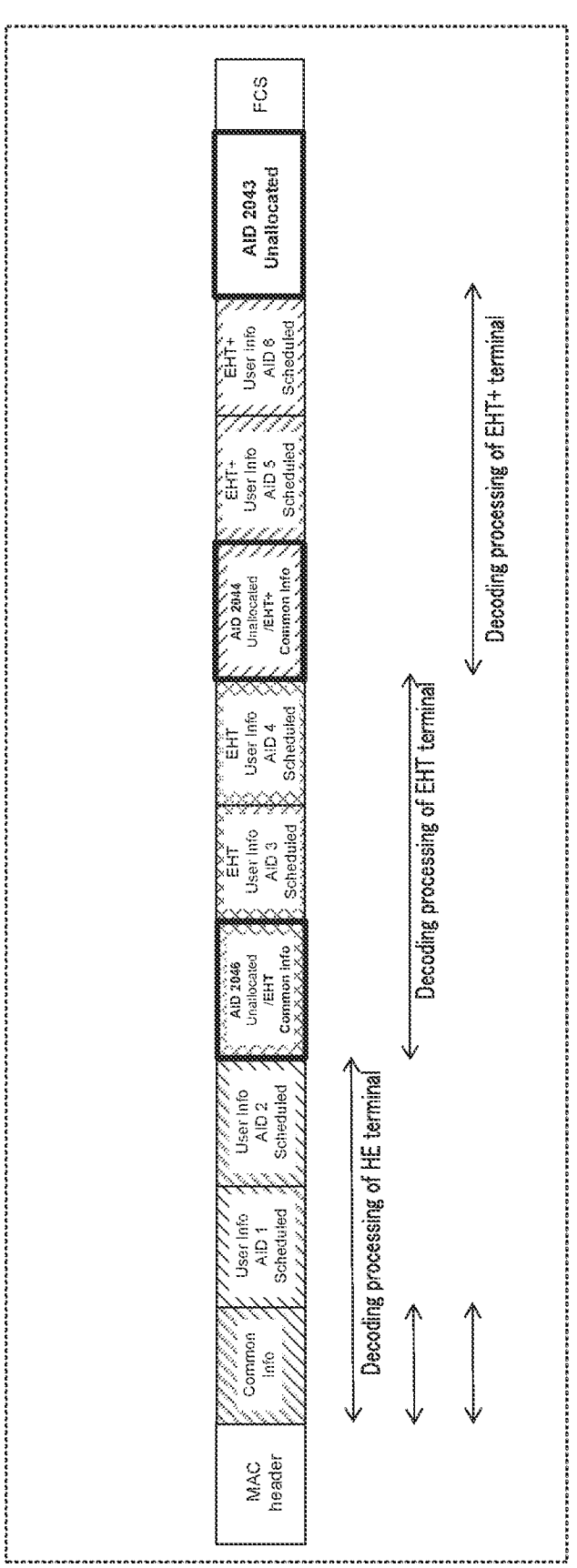
FIG. 13 illustrates an arrangement example for a User info List in Operation Example 1-2.

FIG. 13 illustrates an arrangement example for a User info List in Operation Example 1-2. As illustrated in FIG. 13, User Info formats for HE are arranged in User Info fields between a Common Info format for HE and an extended Common Info format for EHT (i.e., unallocated-RU indication indicated by AID=2046).

User Info formats for EHT format are arranged in User Info fields between the extended Common Info format for EHT and an extended Common Info format for EHT+(i.e., unallocated-RU indication for EHT indicated by AID=2044). Similarly, User Info formats for EHT+ are arranged in User Info fields between the extended Common Info format for EHT+ and an unallocated-RU indication for EHT+(AID=2043).

Such arrangement allows a single Trigger frame to indicate, for a combination of terminals 200 with different versions, the format in accordance with a terminal version, thereby satisfying the requirements of the Backward compatibility and the Forward compatibility.

In addition, as illustrated in FIG. 13, since the User Info field to be received can be distinguished by each terminal version, the reception processing amount of terminal 200 can be reduced. Further, the User Info field indicating the unallocated RU for each terminal version is also used for indication of Common Info for a different terminal version, and thus, the Trigger frame overhead can be suppressed.

As for a Common Info field for HE (see, for example, FIG. 2), all of HE/EHT/EHT+ terminals 200 receives it regardless of the difference in terminal version. EHT/EHT+ terminal 200 may overwrite an extended Common Info for HE with information included in the extended Common Info field for EHT/EHT+(e.g., information such as UL BW).

Operation Example 1-3

FIG. 14 illustrates an exemplary Specific AID table in Operation Example 1-3. In FIG. 14, new AID=4094 may be defined as a Specific AID as in Operation Example 1-1, however, AID=4093 need not be defined. In FIG. 14, "undefined (reserved)" means not defined as a Specific AID. Specific AIDs (0, 2045, and 2046) that are specified or defined in HE may have the same meaning also for EHT/EHT+ terminal 200. On the other hand. Specific AID=4095 is given a different meaning between HE terminal 200 and EHT/EHT+ terminal 200, as in Operation Example 1-1. For terminals 200 of respective generations of HE/EHT/EHT+, a value that is not defined as an AID or a Specific AID may be ignored as undefined (reserved), but may be defined as a Specific AID in further future generations.

When detecting AID=4095, HE terminal 200 may interpret that as a Padding start and may stop the reception processing on subsequent bit information. In contrast, when detecting AID=4095. EHT/EHT+ terminal 200 may interpret the User Info field in which AID=4095 is detected as in a format of extended Common Info for EHT, for example. In other words, EHT/EHT+ terminal 200 may interpret the bit information subsequent to the AID12 subfield as extended signaling indicating the format of the Common Info for EHT.

Further, when detecting AID=4094 for the first time, HE terminal 200 need not perform a particular process. Since the Padding start is indicated to HE terminal 200 by the previously received User Info field (AID=4095), it is assumed that HE terminal 200 does not detect AID=4094.

Alternatively, when detecting AID=4094 for the first time, EHT terminal 200 may interpret the User Info field in which first AID=4094 is detected as the Padding start and may stop the reception processing on subsequent bit information. Further, when detecting AID=4094 for the first time. EHT+ terminal 200 may interpret the User Info field in which first AID=4094 is detected as i a format of extended Common Info for EHT+. In other words, EHT+ terminal 200 may interpret the bit information subsequent to the AID12 subfield as extended signaling indicating the format of the Common Info for EHT+.

Further, when detecting AID=4094 for the second time, HE/EHT terminal 200 need not perform a particular process. Since the Padding start is indicated to HE/EHT terminal 200 by the previously received User Info field, it is assumed that HE/EHT terminal 200 does not detect second AID=4094. Alternatively, when detecting AID=4094 for the second time, EHT+ terminal 200 may interpret the User Info field in which second AID=4094 is detected as the Padding start and may stop the reception processing on subsequent bit information.

Operation Example 1-3 described above provides a similar effect as in Operation Example 1-1. Moreover, according to Operation Example 1-3, one Specific AID (e.g., 4094) is reused for a different terminal version, which reduces Specific AIDs to be newly introduced, as compared with Operation Examples 1-1 and 1-2. Therefore, the scalability for the future systems can be maintained.

(Arrangement Example for User Info List)

Figure 15:
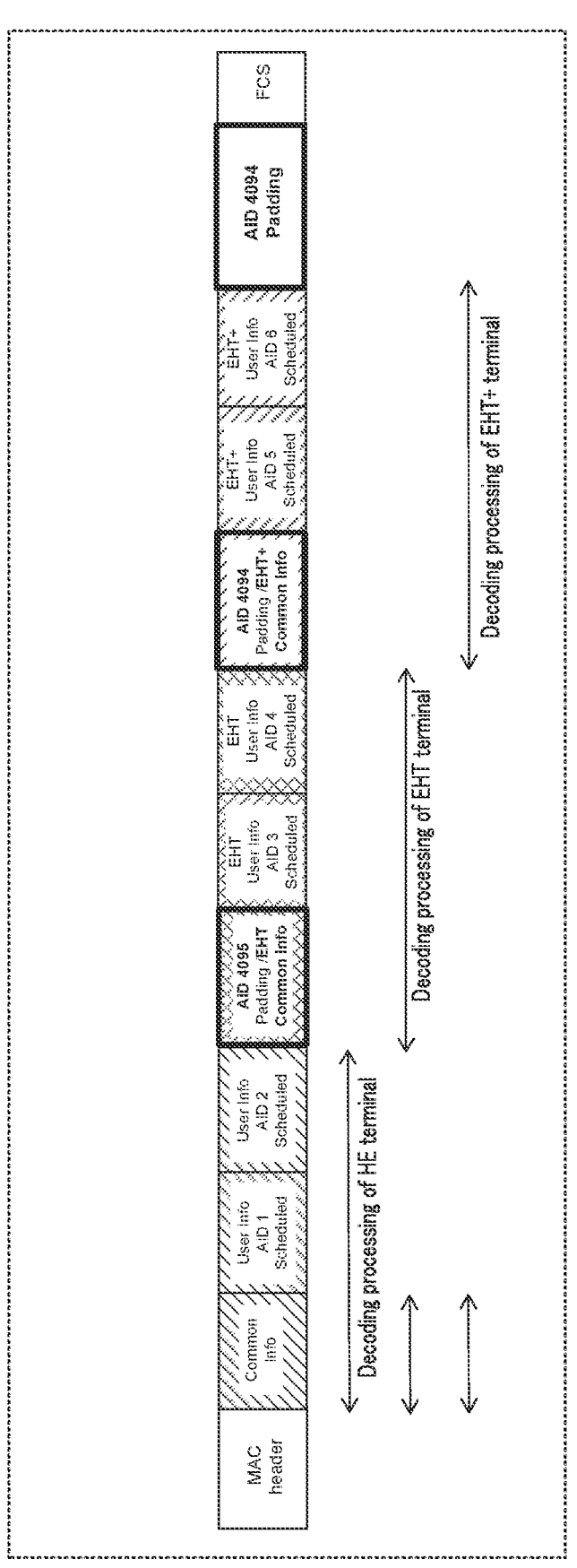
FIG. 15 illustrates an arrangement example for a User info List in Operation Example 1-3.

FIG. 15 illustrates an arrangement example for a User info List in Operation Example 1-3. As illustrated in FIG. 15, User Info formats for HE are arranged in User info fields between a Common Info format for HE and an extended Common Info format for EHT (i.e., Padding start indicated by AID=4095).

User Info formats for EHT are arranged in User Info fields between the extended Common Info format for EHT and an extended Common Info format for EHT+ (i.e., Padding start for EHT indicated by first AID=4094). Similarly, User Info formats for EHT+ are arranged in User Info fields between the extended Common Info format for EHT+ and a Padding start for EHT+(second AID=4094).

Such arrangement allows a single Trigger frame to indicate, for a combination of terminals 200 with different versions, the format in accordance with a terminal version, thereby satisfying the requirements of the Backward compatibility and the Forward compatibility.

In addition, as illustrated in FIG. 15, since the User Info field to be received can be distinguished by each terminal version, the reception processing amount of terminal 200 can be reduced. Further, the User Info field indicating the Padding start for each terminal version is also used for indication of Common Info for a different terminal version, and thus, the Trigger frame overhead can be suppressed.

As for a Common Info field for HE (see, for example, FIG. 2), all of HE/EHT/EHT+ terminals 200 receives it regardless of the difference in terminal version. EHT/EHT+ terminal 200 may overwrite an extended Common Info for HE with information included in the extended Common Info field for EHT/EHT+ (e.g., information such as UL BW).

(Complements to Operation Examples 1-1 to 1-3)

User Info fields may be arranged, in a time direction, in the order from the lower (or older) to the higher (or newer) of terminal versions, as illustrated in FIGS. 11, 13 and 15, for example.

In this case, a Specific AID indicating a format for a new terminal version may be given a meaning that no User Info field for an older terminal version will be placed to a position forward in time of the User Info field including of the Specific AID, for example.

This allows terminal 200 to, for example, skip the reception processing (e.g., decoding) of a User Info field for terminal 200 with a terminal version which is lower than that of this terminal 200. By way of example, in FIG. 11, EHT/EHT+ terminal 200 can skip the reception processing on User Info fields from the Common Info to detection of AID=4095.

Incidentally, when a meaning of a format definition of a User Info field for a Specific AID is changed, User Info fields may be arranged, in the order from the newer to the older of terminal versions in a time direction, in accordance with the meaning, or in the order independent of whether the terminal versions are new or old.

Further, two or more of Operation Examples 1-1 to 1-3 mentioned above may be implemented in combination. In other words, a Specific AID table may be configured by combining entries in two or more of the three Specific AID tables illustrated in FIGS. 10, 12, and 14.

Figure 16:
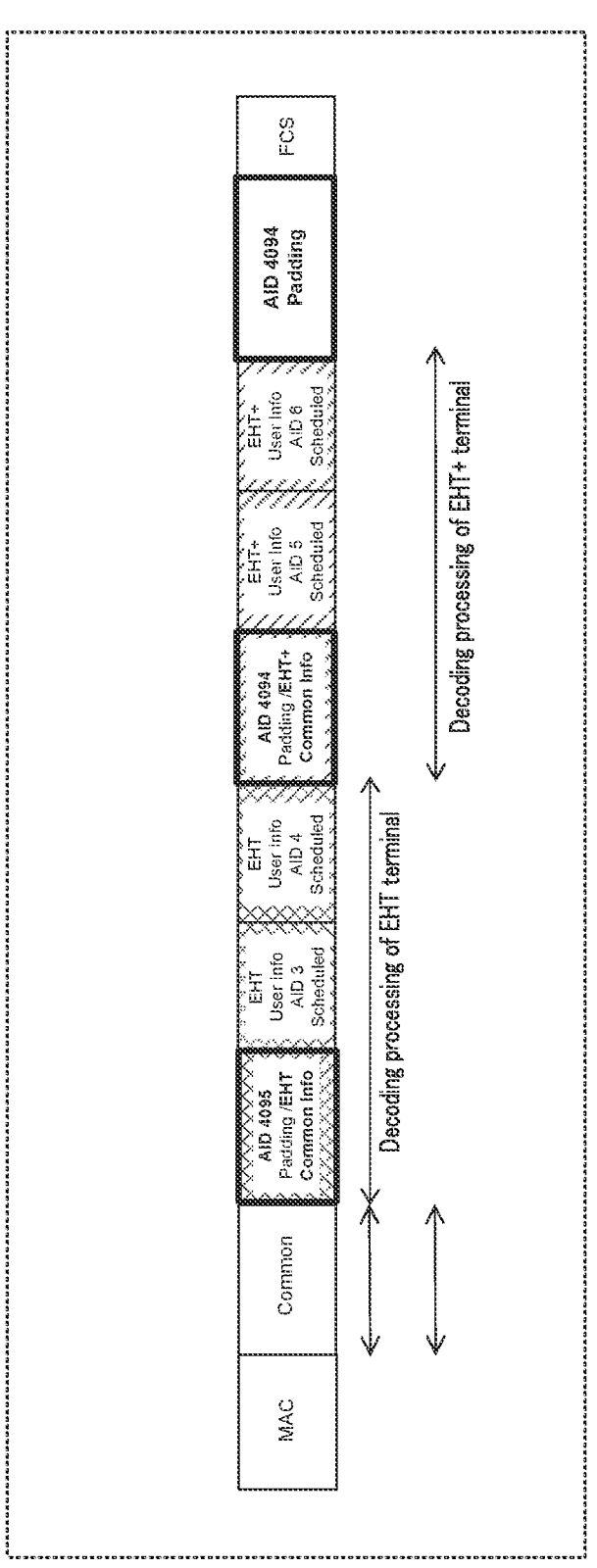
FIG. 16 illustrates an arrangement example for a User info List according to a variation of Operation Examples 1-1 to 1-3.

Further, Operation Examples 1-1 to 1-3 mentioned above have assumed, as a non-limiting example, a User Info List in which User Info fields of the respective formats of HE, EHT, and EHT+ are mixed, but the present disclosure is not limited to this example. For example, as illustrated in FIG. 16, AP 100 may generate a User Info List in a configuration which includes no User Info field in an HE format, by using the Specific AID table illustrated in Operation Example 1-1 (see FIG. 10). The beginning of the User Info fields is the Specific AID (AID=4095) a meaning of which is the Padding start; hence, HE terminal 200 may stop the reception processing on User Info fields.

Meanwhile, AP 100 may indicate, to terminal 200, whether it is a Common Info field in an HE format or a Common Info field in an EHT format, by using a reserved field (e.g., B63 of FIG. 2) of the Common Info in the HE format, for example.

Figure 17:
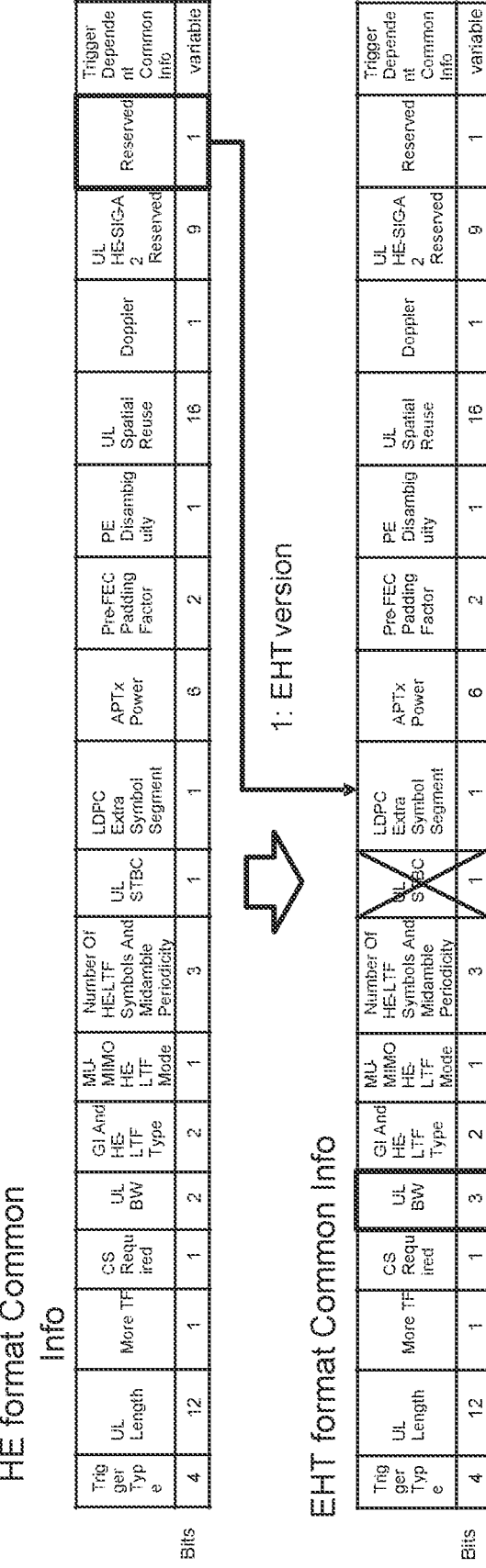
FIG. 17 illustrates an exemplary extended Common field for EHT.

For example, as illustrated in FIG. 17, an EHT format is applied, in which, by setting the reserved HE format to one, the Common Info field in an EHT format is indicated while an EHT format with a UL BW subfield is increased by one bit and a UL Space-time block coding (STBC) subfield is reduced by one bit. This makes it possible to, for example, cope with an increase in supportable bandwidth in EHT and to reduce the impact on performance, by substituting beam-forming even when the STBC is unsupported.

Figure 18:
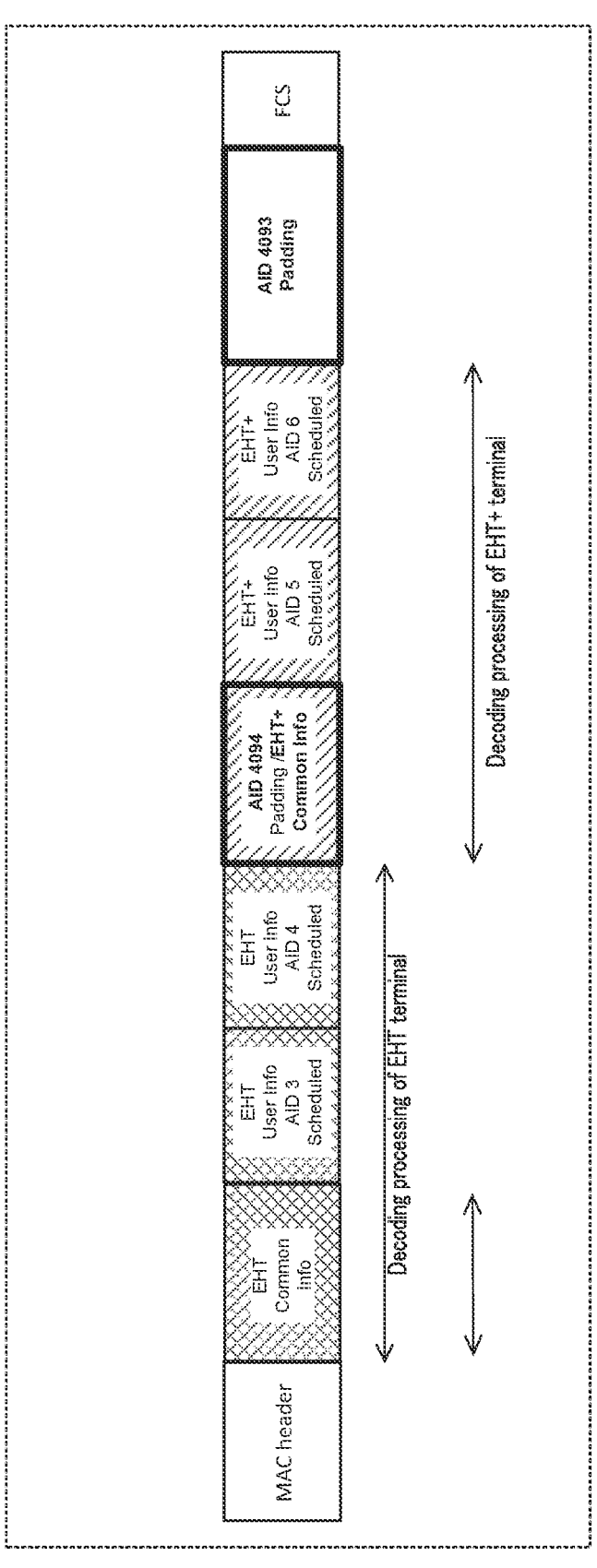
FIG. 18 illustrates an arrangement example for a User info List when the Common field of FIG. 17 is applied.

When the Common Info field with this EHT format is applied, formats for EHT may be applied to User Info fields subsequent to the Common Info field. In this case, as illustrated in FIG. 18, AP 100 can generate a Trigger frame which includes neither Common Info field nor User Info field in HE format.

Thus, the Trigger frame overhead can be reduced when there is no HE terminal 200 in a terminal group to be connected to AP 100 or the number of HE terminals 200 is relatively small.

Further, AP 100 may indicate, to terminal 200, whether a User Info field in an EHT/EHT+ format is included, by using a reserved field of a UL HE-SI-A2 Reserved field, in addition to (or instead of) a reserved field of a Common Info field. For example, when it is indicated that no EHT+ format is included, EHT+ terminal 200 may stop the reception of subsequent User Info Lists (User Info fields), thereby reducing the reception processing amount.

Figure 19:
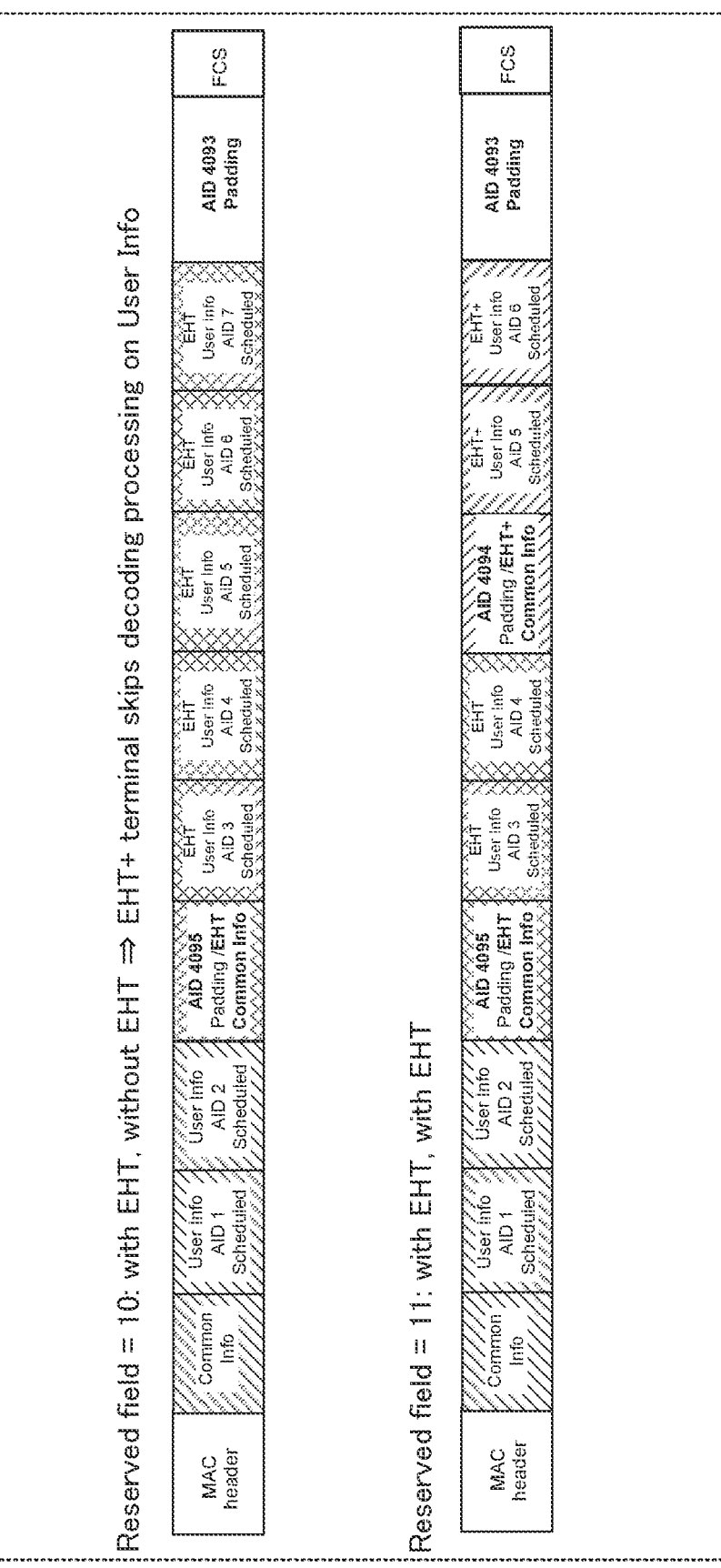
FIG. 19 illustrates an arrangement example for a User info List when a plurality of Reserved fields in the Common field is used.

FIG. 19 illustrates an arrangement example for a User info List of a case where the reserved field of the Common Info field and the reserved field of the UL HE-SI-A2 Reserved field are used for a format indication. For example, the bits of each reserved field="10" may indicate that a User Info field in an EHT format is included and a User Info field in an EHT+ format is not included. Moreover, for example, the bits of each reserved field="11" may indicate that both User Info fields in an EHT format and an EHT+ format are included.

<Operation Example of Trigger Frame Generator 106>

Next, a description will be given of an arrangement method of a User Info field by Trigger frame generator 106 of AP 100.

In HE, for the purpose of reducing the reception processing of terminal 200, an arrangement order of User Info fields is specified in the order of an individually addressed RU (AID=1 to 2007), an RA-RU (AID=0, 2045) and an unallocated RU (AID=2046). For example, terminal 200 stops the reception processing on subsequent User Info fields and generates an uplink signal in a case where an individually addressed RU is allocated (information indicated in AID 12 subfield matches with AID of terminal 200).

In a case where no individually addressed RU is allocated and an allocation occasion of an RA-RU is acquired (e.g., OFDMA Backoff Counter (OBO) becomes zero), terminal 200 stops the reception processing on subsequent User Info fields and generates an uplink signal. Further, when detecting an unallocated RU, terminal 200 stops the reception processing on subsequent User Info fields.

Thus, the terminal can reduce the reception processing by assuming the specified arrangement order and then stopping the reception processing.

Here, it is also possible that a User Info field for the RA-RU and a User Info field for the unallocated RU use a similar EHT/EHT+ format as in FIG. 9 so as to arrange an RU allocation subfield extended with respect to the HE format, in the same manner as the User Info field for the individually addressed RU.

In addition, for example, EHT terminal 200 can acquire an access occasion by the RA-RUs in the HE and EHT formats, and EHT+ terminal 200 can acquire an RA-RU access occasion by the HE, EHT, and EHT+ formats. When RA-RU formats with different versions are mixed in one Trigger frame as described, one or more of the following rules may be applied.

1. EHT/EHT+ terminal 200 can access an RA-RU in an HE format as well as an RA-RU in an EHT/EHT+ format.

2. EHT/EHT+ terminal 200 can access only an RA-RU in EHT/EHT+ format.

In the rule of 1, the access occasion of HE terminal 200 to the RA-RU may become unequal compared with that of EHT/EHT+ terminal 200, but the equality can be improved by the rule of 2. In addition, when the rule of 1 is used, the equality can be improved by lowering the priority of an EHT/EHT+ terminal by using parameter in Uplink OFDMA Random Access (UORA) (e.g., OFDMA contention window (OCW) is set to be larger than that of HE).

In the following, descriptions will be given of operation examples each relating to an arrangement method of an individually addressed RU, an RA-RU, and an unallocated RU in an HE/EHT/EHT+ format.

Operation Example 2-1

Figure 20:
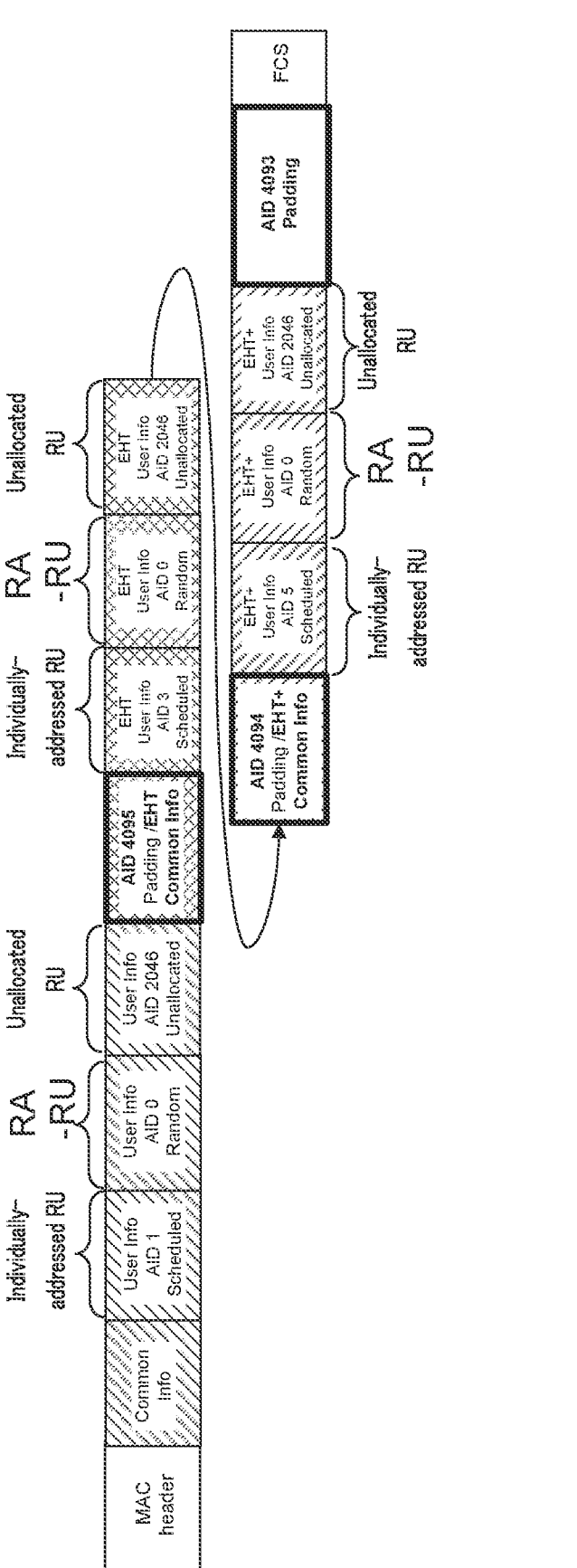
FIG. 20 illustrates an exemplary Resource Unit (RU) arrangement method in a User Info List according to Operation Example 2-1.

As Operation Example 2-1, FIG. 20 illustrates an exemplary arrangement method of an individually addressed RU, an RA-RU, and an unallocated RU in a User Info List.

FIG. 20 illustrates an example in which User Info fields are arranged in the order of terminal versions by using the Specific AID table illustrated in FIG. 10. In each of the terminal versions, the arrangement is made in the order of an individually addressed RU, an RA-RU, and an unallocated RU.

The HE/EHT/EHT+ format can be determined from the definition of the Specific AID table, so that the same value (0 or 2045) as that for HE can be reused for a Specific AID indicating the RA-RU in the EHT/EHT+ format. Similarly, a value (2046) equivalent to HE can be reused for a Specific AID indicating the unallocated RU in the EHT/EHT+ format.

According to Operation Example 2-1, the same arrangement order as in HE can be applied to User Info fields of each terminal version in which terminal 200 performs the reception processing, and thus, the reception processing of terminal 200 can be reduced.

Operation Example 2-2

Figure 21:
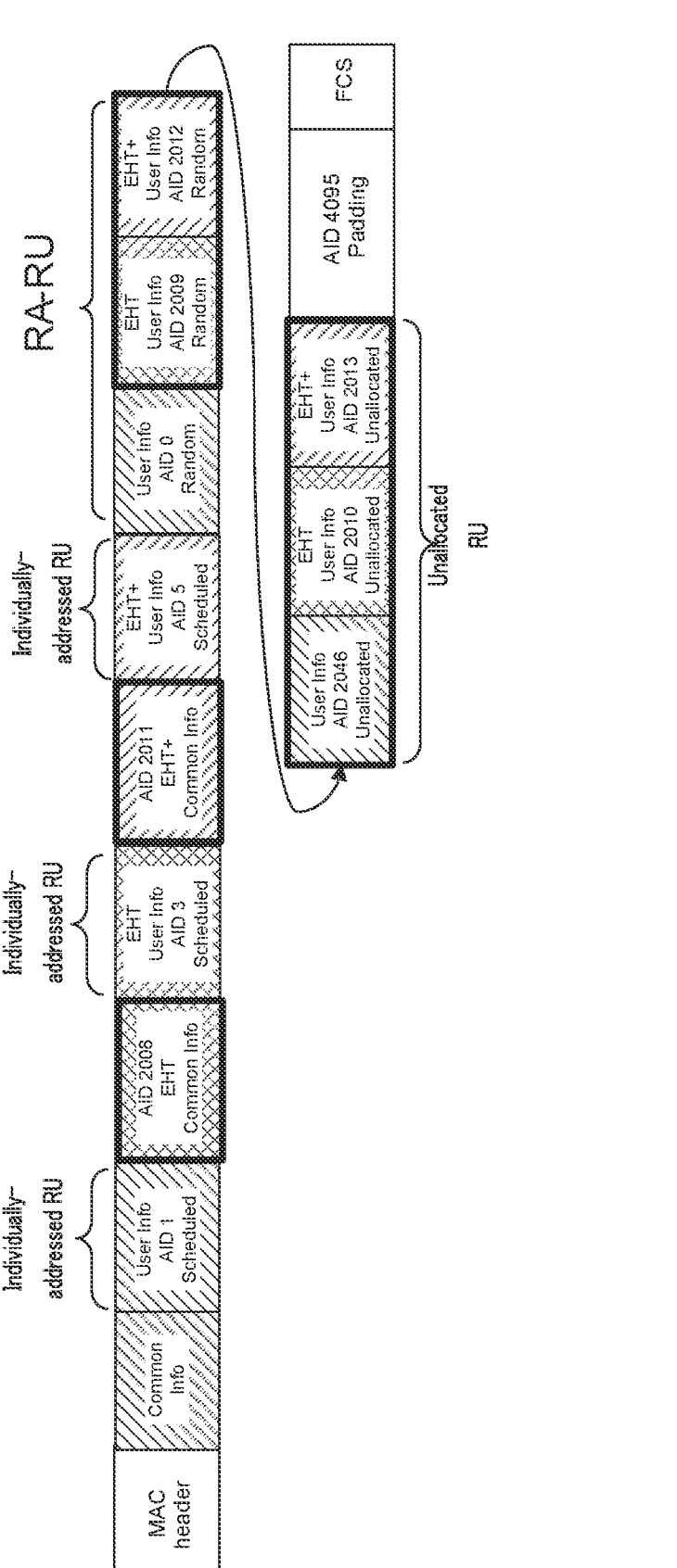
FIG. 21 illustrates an exemplary RU arrangement method in a User Info List according to Operation Example 2-2.

As Operation Example 2-2, FIG. 21 illustrates an exemplary arrangement method of an individually addressed RU, an RA-RU, and an unallocated RU in a User Info List.

In Operation Example 2-2, an arrangement is in the order of an individually addressed RU, an RA-RU, and an unallocated RU while mixing different terminal versions, by using the Specific AID table illustrated in FIG. 22, for example. In FIG. 22, "undefined (reserved)" means not defined as a Specific AID. Specific AIDs (0, 2045, 2046, and 4095) specified or defined in HE may have the same meaning also for EHT/EHT+ terminal 200. On the other hand, Specific AID=2008 is given a different meaning between HE terminal 200 and EHT/EHT+ terminal 200. For example, Specific AID=2008 means an "AID for individual specification" for HE terminal 200 and "EHT Common Info" for EHT terminal 200. Further, in FIG. 22. Specific AID=2011 is given a different meaning between HE/EHT terminal 200 and EHT+ terminal 200. For example, Specific AID=2011 means an "AID for individual specification" for HE/EHT terminal 200 and "EHT+ Common Info" for EHT+ terminal 200. For terminals 200 of respective generations of HE/EHT/EHT+, a value that is not defined as an AID or a Specific AID may be ignored as undefined (reserved), but may be defined as a Specific AID in further future generations.

As illustrated in FIG. 22, in EHT, for example, newly adding a Specific AID (e.g., AID=2008) indicating EHT Common Info, a Specific AID indicating an RA-RU (e.g., AID=2009), and a Specific AID (e.g., AID=2010) indicating an unallocated RU enables an indication of the formats of the User Info fields that include these AIDs.

Moreover, in EHT+, newly adding a Specific AID (e.g., AID=2011) indicating EHT+ Common Info, a Specific AID indicating an RA-RU (e.g., AID=2012), and a Specific AID (e.g., AID=2013) indicating an unallocated RU enables an indication of the formats of the User Info fields that include these AIDs.

Thus, according to Operation Example 2-2, the same arrangement order as in HE can be applied to each User Info List (i.e., a plurality of User Info fields) (in other words, arrangement order can be maintained), which simplifies or reduces the reception processing of terminal 200.

Operation Example 2-3

In Operation Example 2-3, for example, a terminal version to be received by a Trigger frame may be uniquely determined between AP 100 and terminal 200 in advance (e.g., at the time of association), based on a Capability of terminal 200. AP 100 recognizes a version supported by terminal 200 based on the Capability of terminal 200 and indicates, to terminal 200, the version to be received by the Trigger frame.

Note that version recognition matching between AP 100 and terminal 200 is not necessarily performed at the time of association. For example, prior to transmission of the Trigger frame, AP 100 and terminal 200 may perform the version recognition matching.

Terminal 200 performs the reception processing, assuming the format of the User Info field determined in advance between AP 100 and terminal 200, for example.

Figure 23:
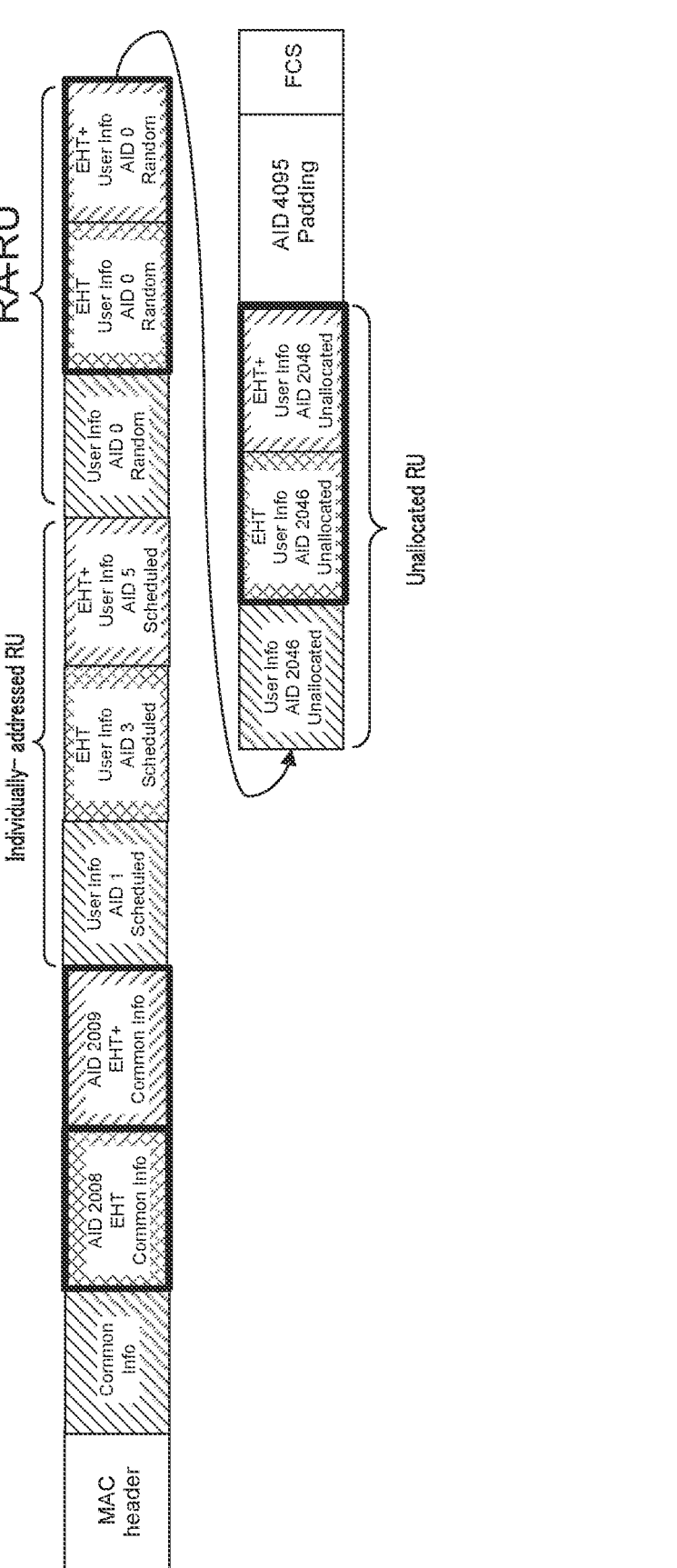
FIG. 23 illustrates an exemplary RU arrangement method in a User Info List according to Operation Example 2-3.

As Operation Example 2-3, FIG. 23 illustrates an exemplary arrangement method of an individually addressed RU, an RA-RU, and an unallocated RU in a User Info List. In Operation Example 2-3, an arrangement is in the order of an individually addressed RU, an RA-RU, and an unallocated RU while mixing different versions, by using the Specific AID table illustrated in FIG. 24, for example. In FIG. 24, Specific AIDs (0, 2045, 2046, and 4095) specified or defined in HE may have the same meaning also for EHT/EHT+ terminal 200. On the other hand, Specific AID=2008 is given a different meaning between HE terminal 200 and EHT/EHT+ terminal 200. For example, Specific AID=2008 means an "AID for individual specification" for HE terminal 200 and "EHT Common Info" for EHT/EHT+ terminal 200. Further, in FIG. 24, Specific AID=2009 is given a different meaning between HE/EHT terminal 200 and EHT+ terminal 200. For example, Specific AID=2009 means an "AID for individual specification" for HE/EHT terminal 200 and "EHT+ Common Info" for EHT+ terminal 200.

As illustrated in FIG. 24, for EHT, a Specific AID (e.g., AID=2008) indicating EHT Common Info is newly added. Moreover, for EHT+, a Specific AID (e.g., AID=2009) indicating EHT+ Common Info is also newly added. Adding these Specific AIDs enables an indication of the formats of the User Info fields that include these AIDs.

Thus, according to Operation Example 2-3, the same arrangement order as in HE can be applied to each User Info List (i.e., a plurality of User Info fields), which reduces reception processing of terminal 200.

Further, in Operation Example 2-3, it is possible to reduce Specific AIDs to be additionally introduced as compared with the example of FIG. 22, by determining the format to be received by terminal 200 in advance between AP 100 and terminal 200 (in other words, by matching the recognitions thereof). Therefore, the scalability for the future can be maintained.

Also, there is no need to indicate a format of User Info field for individual specification (SA: Scheduled access). Terminal 200 may perform the reception processing, assuming the format of its own terminal version. Meanwhile, EHT/EHT+ terminal 200 can stop the reception processing at an early stage when no Common field is included.

Incidentally, in a case where the format to be received by terminal 200 is determined in advance, Trigger frame formats respectively corresponding to the versions of HE, EHT, and EHT may be defined. That is, a new Trigger frame in which more than one terminal versions are not mixed in one Trigger frame may be newly defined in EHT and EHT+. AP 100 may indicate, to terminal 200, uplink transmission by using an Aggregated-MAC Protocol Data Unit (MPDU) where these Trigger frames coexist.

Operation Example 2-4

Figure 25:
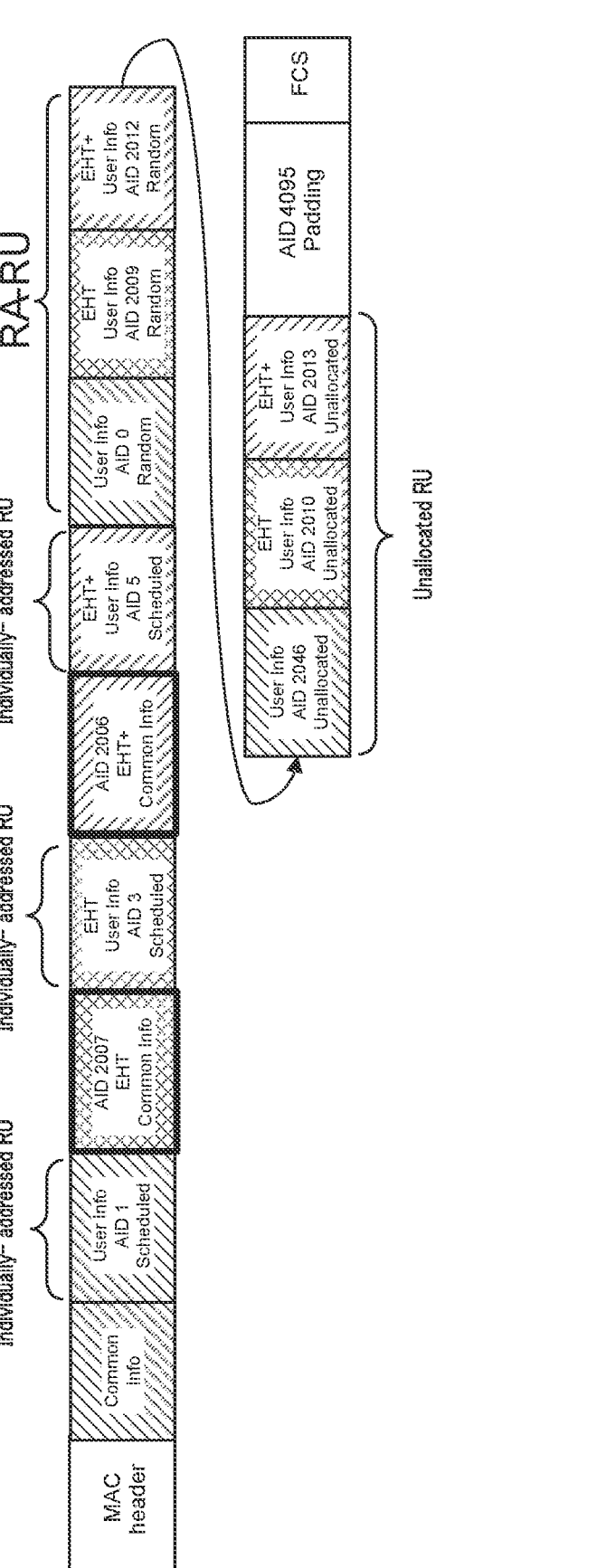
FIG. 25 illustrates an exemplary RU arrangement method in a User Info List according to Operation Example 2-4.

As Operation Example 2-4, FIG. 25 illustrates an exemplary arrangement method of an individually addressed RU, an RA-RU, and an unallocated RU in a User Info List.

In Operation Example 2-4, an arrangement is in the order of an individually addressed RU, an RA-RU, and an unallocated RU while mixing different versions, by using the Specific AID table illustrated in FIG. 26, for example. Compared with the example of FIG. 22, Specific AIDs indicating an EHT Common Info field and an EHT+ Common Info field are changed from 2008 to 2007 and from 2009 to 2006, respectively. In other words, a Specific AID for EHT/EHT+ terminal 200 is selected and applied from AIDs=1 to 2007, each of which is an AID of the individually addressed RU in HE. In FIG. 26, "undefined (reserved)" means not defined as a Specific AID. Specific AIDs (0, 2045, 2046, and 4095) specified or defined in HE may have the same meaning also for EHT/EHT+ terminal 200. On the other hand, Specific AID=2007 is given a different meaning between HE terminal 200 and EHT/EHT+ terminal 200. For example, Specific AID=2007 means "AID for individual specification" for HE terminal 200 and "EHT Common Info" for EHT/EHT+ terminal 200. Further, in FIG. 26, Specific AID=2006 is given a different meaning between HE/EHT terminal 200 and EHT+ terminal 200. For example, Specific AID=2006 means an "AID for individual specification" for HE/EHT terminal 200 and "EHT+ Common Info" for EHT+ terminal 200.

In HE, for the purpose of reducing the reception processing of terminal 200, it is specified that, in a User Info List, a User Info field of AIDs=1 to 2007 used for an individually addressed RU is not positioned behind in time a User Info field of AID=2008 or more.

Since terminal 200 can determine, at the stage of detecting an AID of AID=2008 or more, that no individually addressed RU is allocated, terminal 200 not performing RA transmission can stop processing (e.g., transmission processing).

Additionally, since it is possible to satisfy, in an EHT version or a later version of the EHT version, the specification relating to an arrangement order of User Info fields in HE mentioned above by using the Specific AID table illustrated in FIG. 26, the reception processing of EHT/EHT+ terminal 200 can also be reduced in the same manner as of HE terminal 200.

Incidentally, of AIDs=1 to 2007, a value used for a Specific AID for EHT/EHT+ terminal 200 may be defined by standards, for example. Alternatively, for example, of AIDs=1 to 2007, a value used for a Specific AID may be determined for each AP 100. Then, from AP 100 to terminal 200, the determined Specific AID may be indicated at the time of negotiation or may be indicated by a beacon, for example.

Operation Example 2-5

An EHT/EHT+ format may be indicated by using a reserved field of a User Info field, instead of newly setting a definition for the Specific AID that indicates the RA-RU and the unallocated RU for EHT/EHT+ terminal 200 mentioned above.

Figure 27:
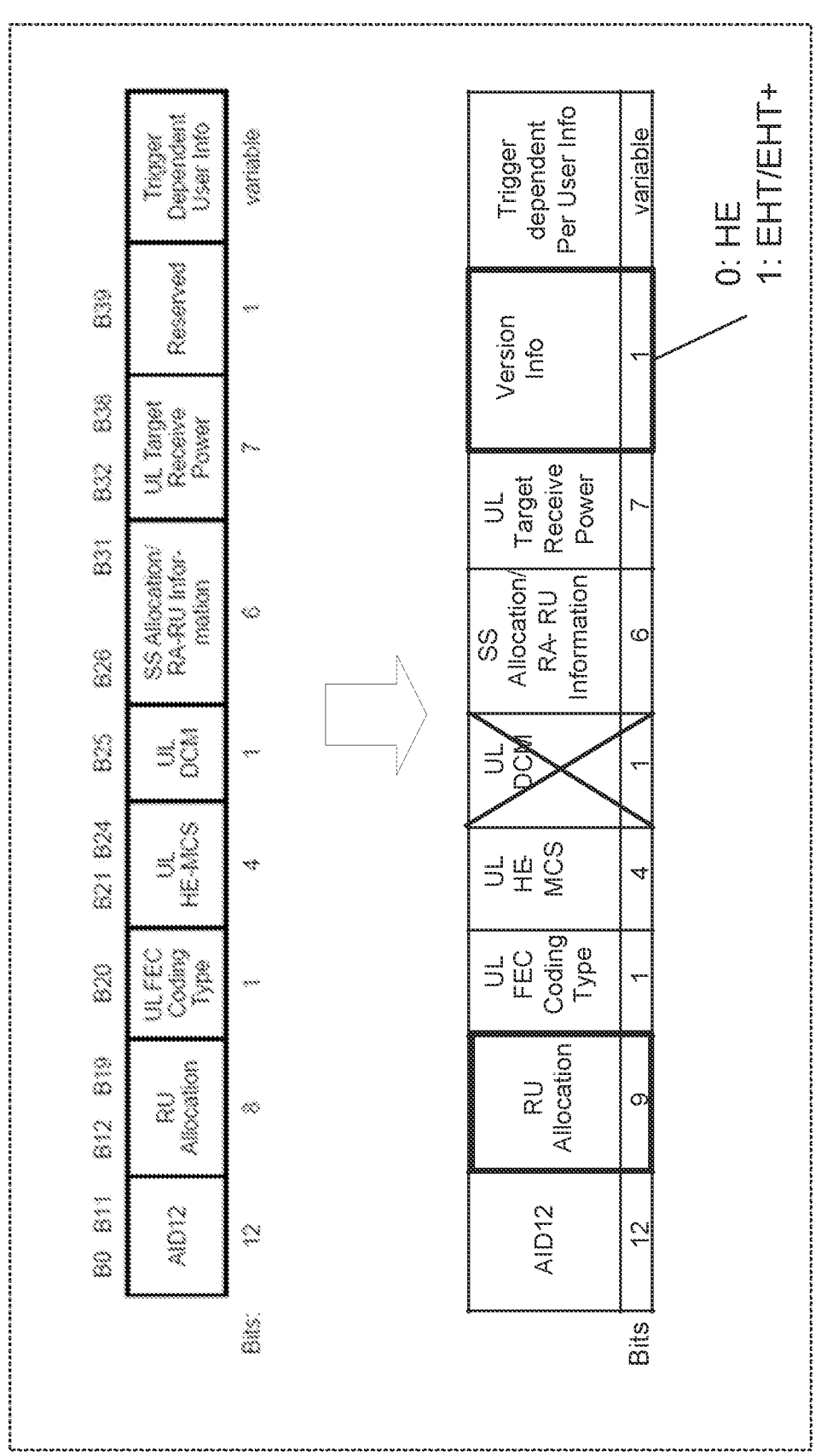
FIG. 27 illustrates an exemplary User Info field in an EHT/EHT+ format in Operation Example 2-5, in comparison in an HE format.

An exemplary User Info field that performs an RA-RU indication in the EHT/EHT+ format is illustrated at the lower section of FIG. 27. Compared with a User Info field in an HE format (the same as in FIG. 3) illustrated in the upper section of FIG. 27, in the User Info field of the EHT/EHT+ format, the size of RU allocation subfield may be extended (e.g., extension by one bit from eight bits to nine bits). This extension makes it possible to cope with an increase in range of the supportable allocation band (e.g., extension from 160 MHz to 320 MHz).

In addition, in the User Info field in the EHT/EHT+ format, the presence or absence of application of DCM may be included in a MCS table; hence, a UL DCM subfield (one bit) illustrated in the upper section of FIG. 27 may be deleted as illustrated in the lower section of FIG. 27.

Further, as illustrated in FIG. 27, a Reserved field (one bit) in the HE format may be replaced with a Version Info field in an EHT/EHT+ format. For example, as illustrated in FIG. 27, when a value of the Version Info field is zero, an HE format for an RA-RU may be indicated, and when a value of the Version Info field is one, an EHT/EHT+ format for an RA-RU may be indicated.

The introduction of the Version Info field eliminates the need to newly introduce an unused AID as a Specific AID, for example. Accordingly, the Specific AID table illustrated in FIG. 26 can be reduced as illustrated in FIG. 28, for example. Since the consumption of unused AIDs can be reduced, the scalability for the future systems can be maintained.

Figure 29:
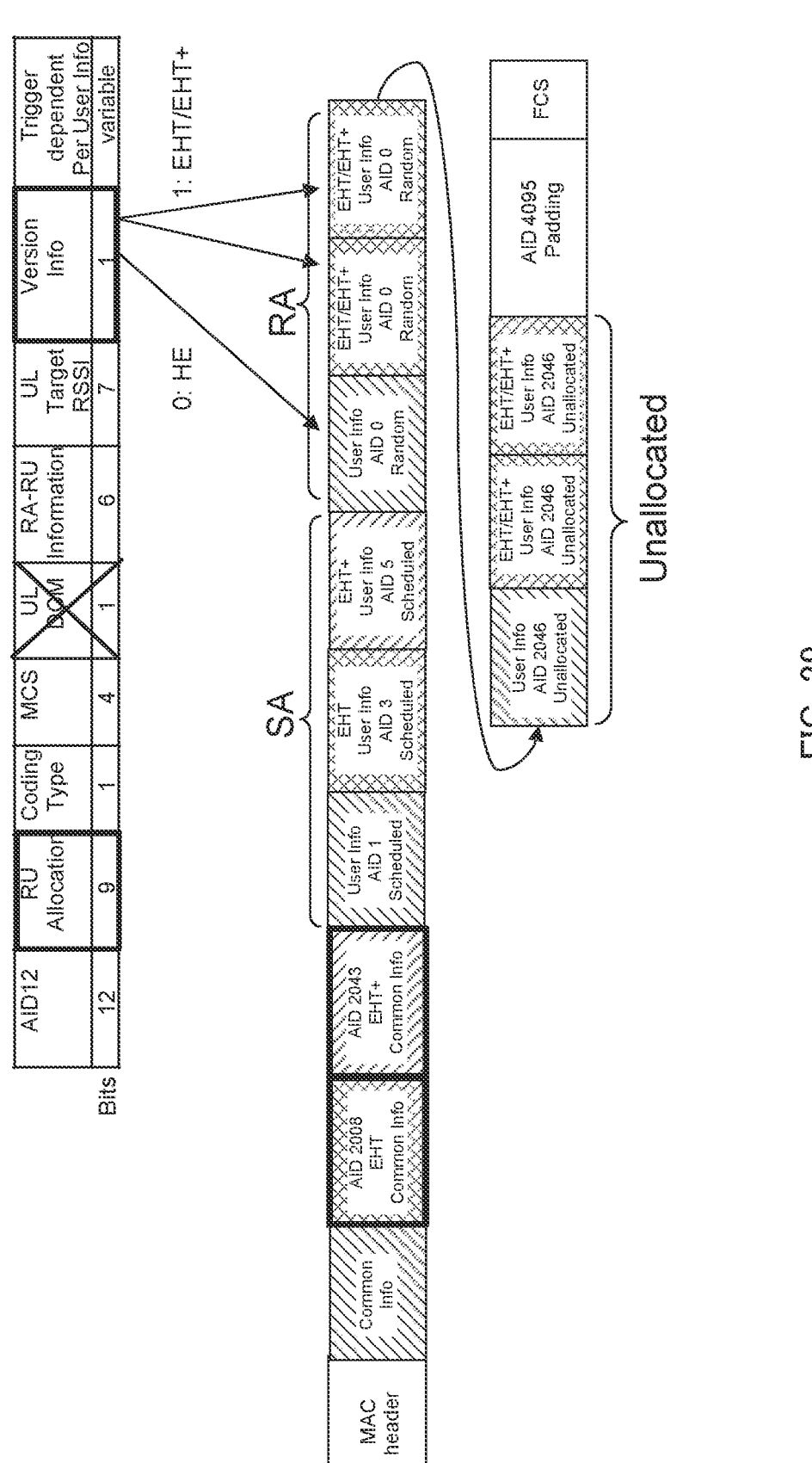
FIG. 29 illustrates an arrangement example for a User info List in Operation Example 2-5.

FIG. 29 illustrates a mapping example for a User info List in Operation Example 2-5. As illustrated in FIG. 29, for example, an HE format for an RA-RU may be indicated when a value of a Version Info field is zero, whereas an EHT/EHT+ format for an RA-RU may be indicated when a value of the Version Info field is one.

Alternatively, an EHT/EHT+ format may be defined that follows the position and size of a subfield in the HE format. An example of such an EHT/EHT+ format is illustrated in the lower section of FIG. 30. As illustrated in the lower section of FIG. 30, the bit at the position of the UL DCM subfield (upper section of FIG. 29), which is unnecessary in EHT/EHT+, is made to be an additional bit for an RU Allocation field (e.g., Most Significant Bit (MSB) of nine bits).

Thus, even when the Reserved field is made to be the Version Info field of the User Info field for the RA-RU as mentioned above, the position and size of a subfield can be shared with the HE format. Terminal 200 can acquire information on each subfield, assuming the HE format, regardless of a value of the Version Info field, thereby simplifying the reception processing of terminal 200.

Incidentally, the above-mentioned EHT/EHT+ format that follows the position and size of the subfield in the HE format is not limited to being used for the RA-RU indication. For example, additionally or alternatively, this EHT/EHT+ format may be applied to an individually addressed RU indication.

Further, the EHT/EHT+ format may make the bit at the position of the Reserved field (one bit) in the HE format to be an additional bit of an SS Allocation/RA-RU Information field (e.g., MSB of seven bits).

Figure 30:
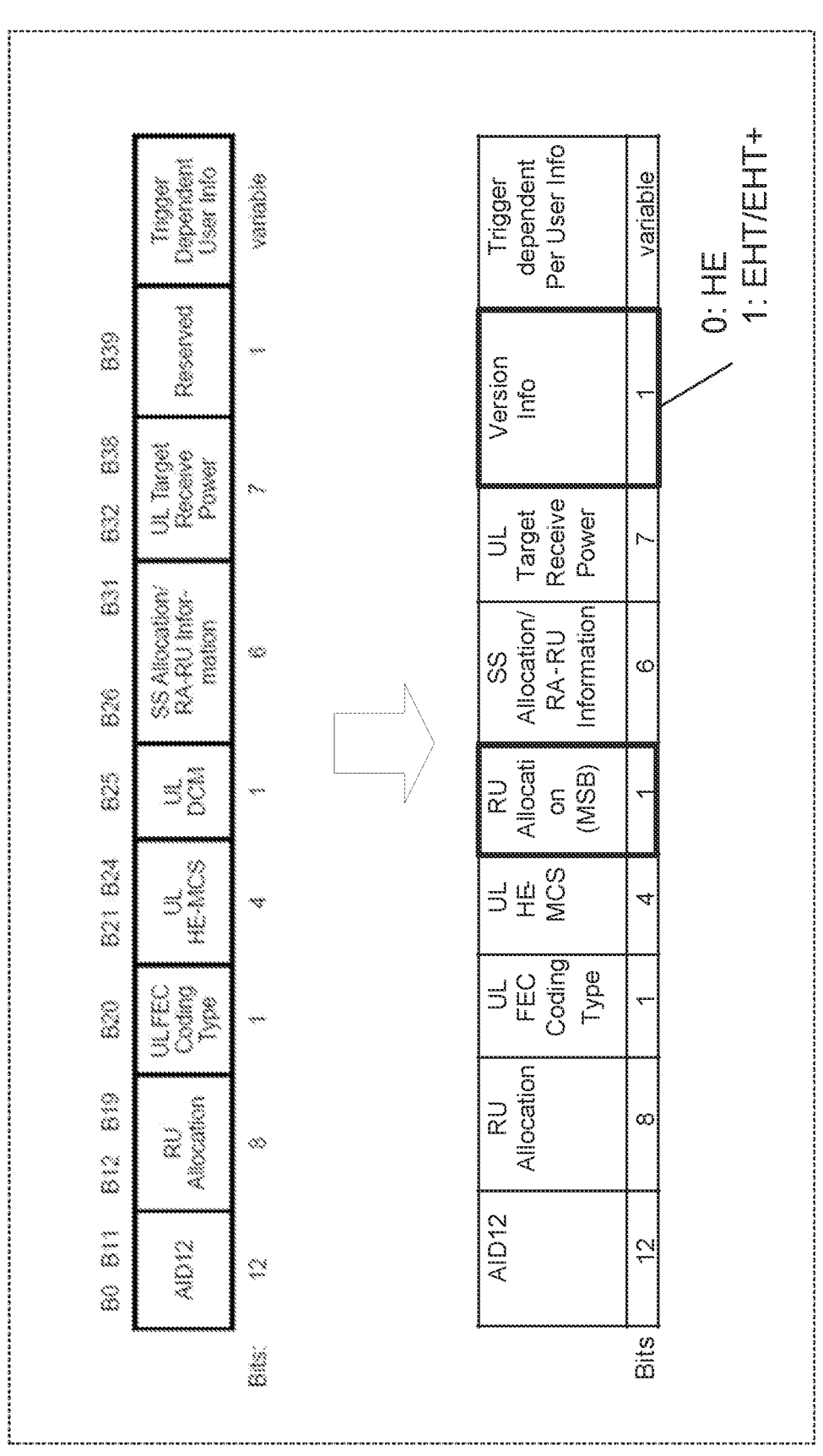
FIG. 30 illustrates an exemplary variation of a User Info field in an EHT/EHT+ format, in comparison in an HE format.

In the example of FIG. 30 (example of RA-RU), the size of SS Allocation/RA-RU Information may be reduced by one bit compared with the example of FIG. 9 (example of individually addressed RU) in order to apply the size of HE format (e.g., six bits). This is because, in an individually addressed RU, information on the SS Allocation/RA-RU Information subfield indicates the number of spatial multiplexes and corresponds to an extension of the number of spatial multiplexes in EHT.

On the other hand, in an RA-RU, information on the SS Allocation/RA-RU Information subfield indicates the number of contiguous RA-RUs (the number of spatial multiplexes in RA-RU may be fixed to one). Although EHT has a wider allocation range as compared with HE, limiting the number of contiguous RA-RUs to a range representable in six bits allows a Reserved field to be used as a Version Info field, as illustrated in FIG. 30.

(Others)

In each of the above-mentioned examples, the EHT format and the EHT+ format are indicated respectively by the User Info field with the Specific AIDs applied, but the present disclosure is not limited to this. For example, as for an HE format and a format for an EHT version or later version (e.g., EHT format and EHT+ format), indication may be made by using User Info fields with Specific AIDs applied, and as for the indication of the format for EHT or later version, the EHT or later version may be explicitly indicated by providing a subfield that indicates Version information in the User Info field.

Figure 31:
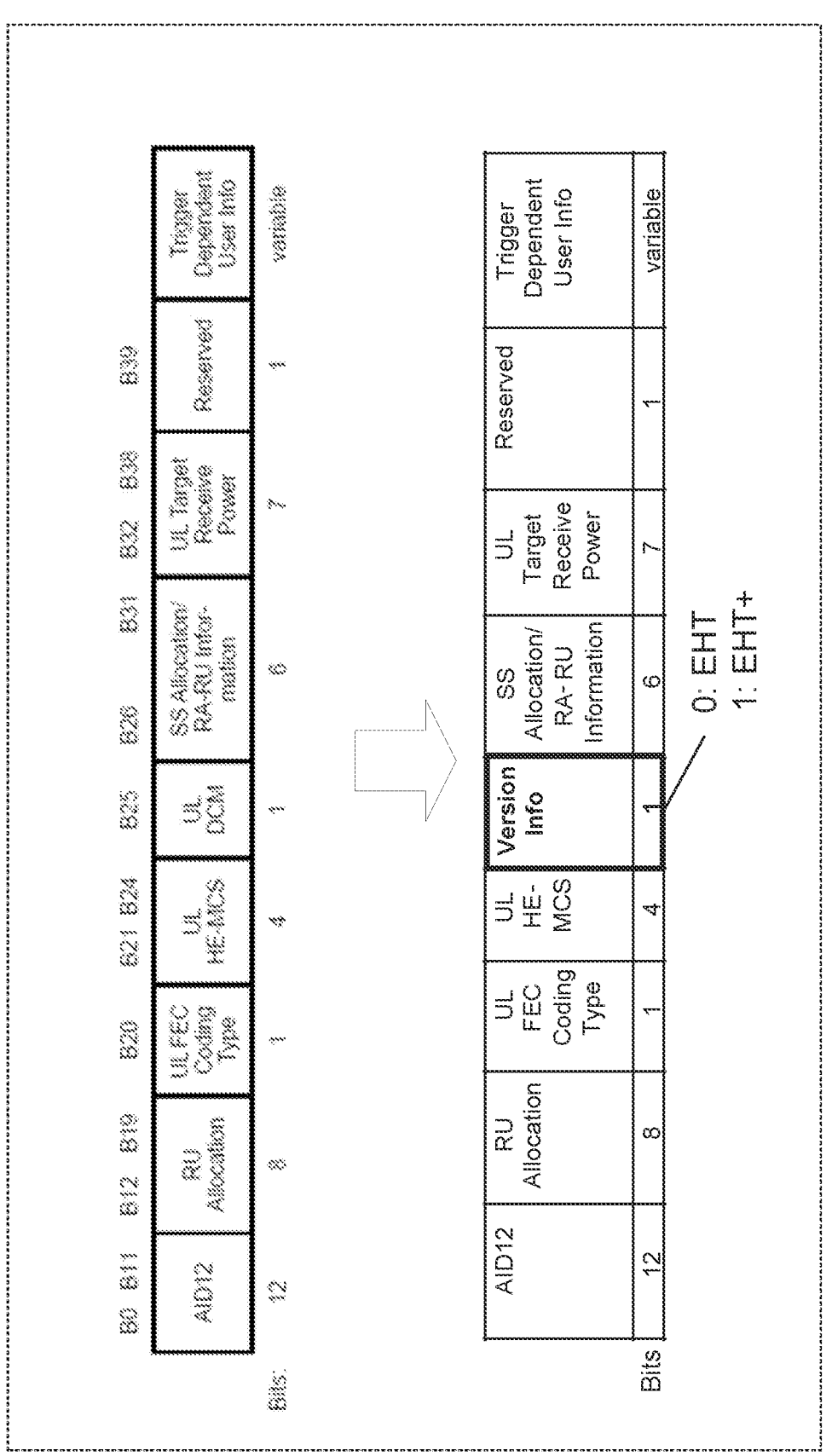
FIG. 31 illustrates another exemplary variation of a User Info field in an EHT/EHT+ format, in comparison in an HE format.

By way of example, as illustrated in FIG. 31, instead of the UL DCM subfield (one bit) in the HE format, a Version Info subfield (one bit) indicating either of EHT or EHT+ may be provided. Furthermore, in accordance with the Version Info field (in accordance with whether it is EHT or EHT+), a format of another subfield (e.g., Trigger dependent Per User Info) may be changed. This eliminates the need to introduce an unused AID as a new Specific AID, and thus, the scalability for the future systems can be maintained.

Figure 32:
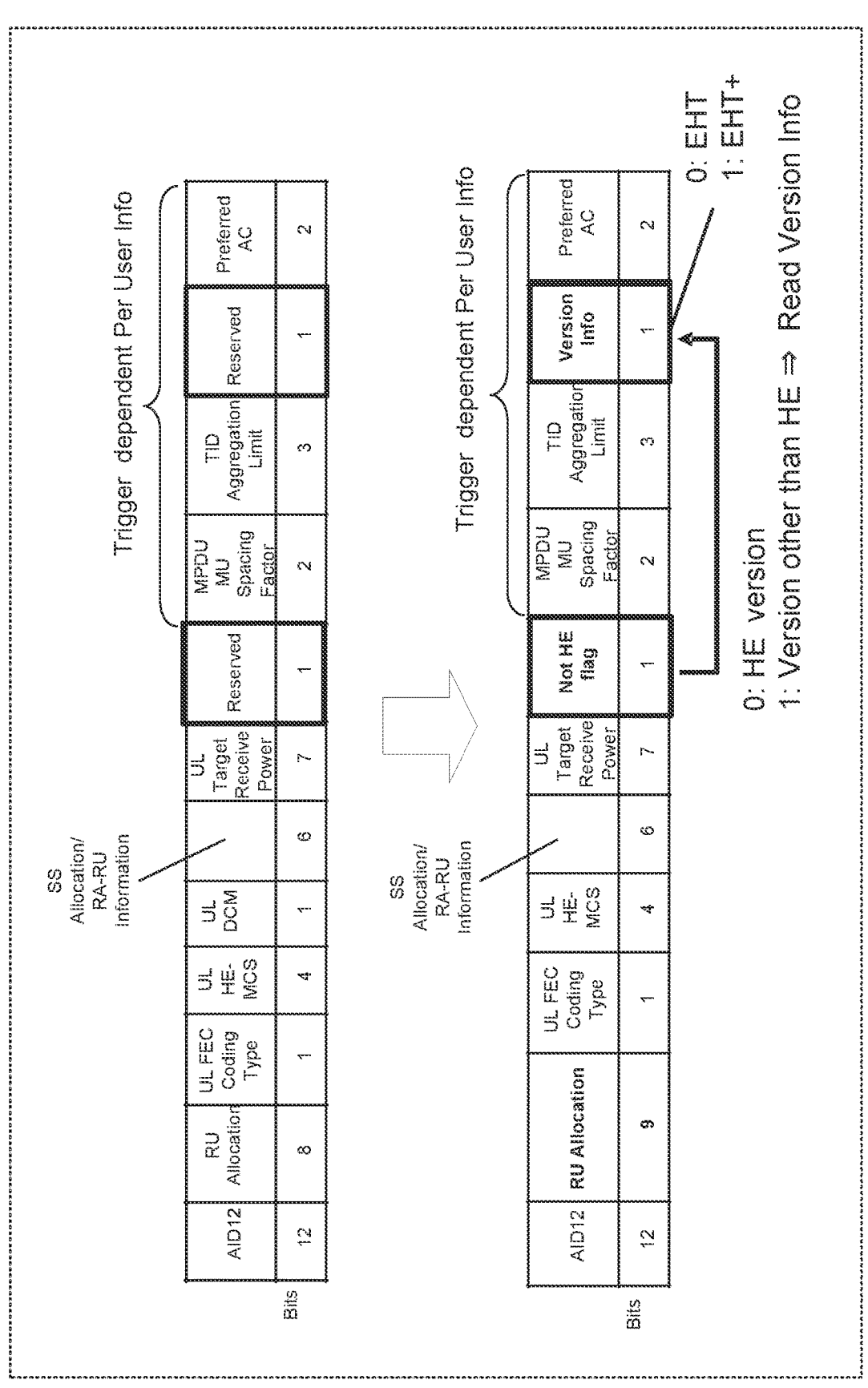
FIG. 32 illustrates still another exemplary variation of a User Info field in an EHT/EHT+ format, in comparison in an HE format.

Further, as illustrated in FIG. 32, for example, a format for EHT/EHT+ may be indicated by using a Reserved of Trigger dependent User Info, in addition to (or instead of) a reserved field of a User Info field.

In the example of FIG. 32, whether the version is HE or other than HE is indicated by the reserved field (one bit) of the User Info field. Further, when the reserved field of the User Info field indicates a version other than HE, whether the version is EHT or EHT+ is indicated by the Reserved of the Trigger dependent User Info.

For a PPDU format of an uplink signal indicated by a Trigger frame, a PPDU format corresponding to the format of the User Info field of the Trigger frame may be applied. In other words, the uplink signal indicated in the User Info field in an HE format may be transmitted in an HE TB PPDU format. Alternatively, the uplink signal indicated in the User Info field in an EHT format may be transmitted in an EHT TB PPDU format. Further, the uplink signal indicated in the User Info field in an EHT+ format may be transmitted in an EHT+ TB PPDU format. In this case, when a User Info field includes version information (e.g., Version Info subfield), a Version Info field will direct a TB PPDU format that requests transmission.

The method to transmit one Trigger frame including a plurality of versions (called Method A) and the method to transmit Trigger frames with a plurality of formats defined for each version, by using an Aggregated-MPDU (called Method B) in the above-described embodiment may be used in combination. For example, Method A may be used in a case where the format to be received by terminal 200 is not determined (or has been not determined) between AP 100 and terminal 200 in advance, whereas Method B may be used in a case where the format to be received by terminal 200 is determined (or has been determined) in advance.

A format of a Trigger frame may be changed in accordance with a Multi-AP Operation type. For example, a configuration is possible where a Common info field includes a Multi-AP (MAP) type (e.g., Coordinated Spatial Reuse (C-SR), Coordinated Orthogonal Frequency Division Multiple Access (C-OFDMA), Joint Transmissions (JT), Coordinated Beamforming (CBF)), and the format corresponding to the type is used for a User Info field. Even in this case, the methods of the present embodiment are applicable.

In the above-mentioned embodiment, an example has been described in which the size of each User Info field in the EHT format and the EHT+ format is set to be the same as that in the HE format in order to ensure the Backward compatibility, but the present disclosure is not limited to this example.

For example, when a Specific AID that indicates a version delimiter is defined as in the User Info List illustrated in FIG. 11, the size of each User Info field of the EHT format and the EHT+ format may be different from the size of that in the HE format.

In one example, with respect to an RU allocation subfield and an SS Allocation subfield of a User Info field, the EHT format and the EHT+ format may be defined as having a larger size than that in the HE format because, in the EHT format and the EHT+ format, an allocation range is wider and the supportable number of spatial multiplexes is greater.

For example, additional information for distinguishing between a plurality of versions of EHT and later (e.g., EHT, EHT+, EHT++, and so forth) may be added to the EHT/EHT+ format. The size and content of each subfield of a User Info field may be changed in accordance with the version distinguished by the additional information.

When a Padding start (e.g., 4095 for HE) or an unallocated-RU indication (e.g., 2046 for HE) for an older version is used for a Specific AID, terminal 200 with the older version stops decoding subsequent User Info fields: hence, the Backward compatibility can be reserved.

Incidentally, the method to indicate the version information by using the Reserved (one bit) of the User Info field is not limited to being applied to a User info field for an RA-RU, as illustrated in FIG. 27 or FIG. 30. For example, the method is applicable to an individually addressed RU or an unallocated RU in the same manner.

Further, in each of the examples of FIGS. 27 and 30, one bit is used to distinguish between the versions HE and EHT or later, additional information (called Further Version Info) may be added for distinguishing between the plurality of versions such as EHT, EHT+, EHT++, and so forth.

Figure 33:
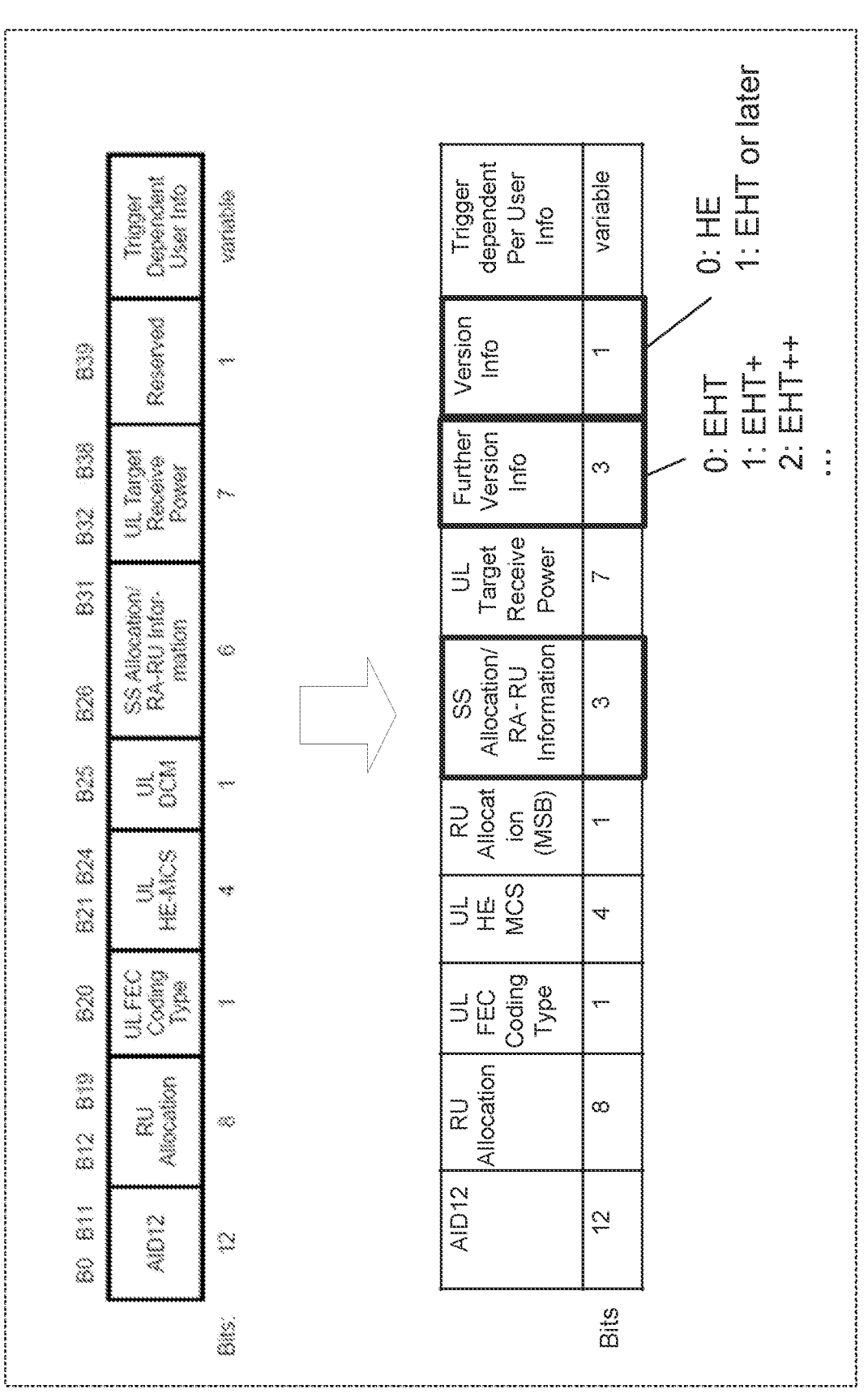
FIG. 33 illustrates yet another exemplary variation of a User Info field in an EHT/EHT+ format, in comparison in an HE format.

For example, FIG. 33 illustrates an exemplary User Info Field to which Further Version Info is added. In the example of FIG. 33, the Reserved field (one bit) is used as a Version Info subfield in order to include information for distinguishing between versions of HE and EHT or later. In a case where the EHT version or a later version of the EHT version is indicated (e.g., Version Info field=1), the Further Version Info subfield (e.g., three bits) may include the information for distinguishing between the plurality of versions of EHT and later (EHT, EHT+, EHT++, and so forth). In order to ensure the Backward compatibility, when the size is matched with that of HE format, an SS Allocation/RA-RU Information subfield (six bits in HE format) may be reduced, for example.

In the case of RA-RU, the number of contiguous RA-RUs indicated by the subfield may be reduced to three bits. For example, the number of contiguous RA-RUs may be limited to one to seven and reduced to three bits. This is because there is little need to indicate a large number of contiguous RA-RUs when the size of RA-RU is large. Alternatively, when the size of RA-RU is decreased, the indication can be performed as conventional by the HE format.

Alternatively, the size may be reduced by limiting a degree of freedom of the number of contiguous RA-RUs to a power of two and representing an exponent of two in an RA-RU Information subfield. Further, the number of contiguous RA-RUs may be determined, without being limited to a power of two, within a range that can be expressed by an RA-RU size to be applied (e.g., three bits). For example, the standards may define a rule in which values of a subfield=0, 1, 2, 3, and so forth till 7 represent the number of contiguous RA-RUs=1, 2, 8, 32, and so forth till 64, respectively.

Meanwhile, in the case of an individually addressed RU, the number of bits of an SS Allocation subfield may be reduced by limiting the number of spatial multiplexes in UL MU-MIMO. The limitation may be, for example, a rule to reduce the upper limit of the number of multiplexes to be applied or to limit, by a power of two or the like as mentioned above, the number of multiplexes to be applied. Alternatively, for example, a rule is possible in which a starting stream number in the spatial multiplexing included in the SS Allocation may be derived by terminal 200 decoding an RU allocation subfield from the User Info fields of all individually addressed RUs included in the User Info List and determining how many times the same RU allocation is indicated. This enables the reduction in size of the SS Allocation subfield.

The term, such as "part" or "portion" or the term ending with a suffix, such as "-er" "-or" or "-ar" may be replaced with another term, such as "circuit (circuitry)," "device," "unit," or "module."

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A base station according to an exemplary embodiment of the present disclosure may include: control circuitry, which, in operation, associates, in accordance with a terminal version, information on a format of a terminal information field for a control signal indicating transmission of an uplink signal and unused identification information for terminal identification information to be assigned to an individually-specified terminal; and transmission circuitry, which, in operation, transmits the control signal including the unused identification information that has been associated.

In an exemplary embodiment of the present disclosure, the control circuitry may associate the unused identification information with a format that indicates a Padding start for a first terminal version and a format that indicates information shared by a plurality of terminals for a second terminal version.

In an exemplary embodiment of the present disclosure, the control circuitry may associate the unused identification information with a format that indicates an unallocated resource for a first terminal version and a format that indicates information shared by a plurality of terminals for a second terminal version.

In an exemplary embodiment of the present disclosure, the control circuitry may change, in accordance with the terminal version, a definition of a format of a terminal information field corresponding to an arrangement order of a terminal information field for which the unused identification information is used, among a plurality of the terminal information fields included in the control signal.

In an exemplary embodiment of the present disclosure, the control circuitry may arrange a plurality of terminal information fields included in the control signal for each terminal version and may arrange, in one terminal version, the terminal information fields in the order of an individually addressed resource, a random access resource, and an unallocated resource.

A terminal according to an exemplary embodiment of the present disclosure may include: control circuitry, which, in operation, determines a terminal information field to be received, based on association in accordance with a terminal version between information on a format of a terminal information field for a control signal indicating transmission of an uplink signal and unused identification information for terminal identification information to be assigned to an individually-specified terminal; and reception circuitry, which, in operation, performs reception processing on the terminal information field that has been determined.

A communication method according to an exemplary embodiment of the present disclosure may include: associating, by a base station, in accordance with a terminal version, information on a format of a terminal information field for a control signal indicating transmission of an uplink signal and unused identification information for terminal identification information to be assigned to an individually-specified terminal; and transmitting, by the base station, the control signal including the unused identification information that has been associated.

A communication method according to an exemplary embodiment of the present disclosure may include: determining, by a terminal, a terminal information field to be received, based on association in accordance with a terminal version between information on a format of a terminal information field for a control signal indicating transmission of an uplink signal and unused identification information for terminal identification information to be assigned to an individually-specified terminal; and performing, by the terminal, reception processing on the terminal information field that has been determined.

A communication apparatus according to an exemplary embodiment of the present disclosure includes: circuitry, which, in operation, configures a first value to an association ID (AID) 12 subfield of a first field of a trigger frame that requests an Extremely High Throughput (EHT) trigger-based (TB) physical-layer protocol data unit (PPDU); and a transmitter, which in operation, transmits the trigger frame, in which the first value indicates that the first field includes information commonly used for transmission of the EHT TB PPDU.

In the communication apparatus according to an exemplary embodiment of the present disclosure: the first value indicates that the trigger frame may include a user information field for EHT after the first field.

In the communication apparatus according to an exemplary embodiment of the present disclosure: the first value may be interpreted by a High Efficiency (HE) station (STA) as an indication that the first field is addressed to another STA.

In the communication apparatus according to an exemplary embodiment of the present disclosure: a length of the first field may be equal to a length of a first user information field of the trigger frame.

The communication apparatus according to an exemplary embodiment of the present disclosure may be an EHT access point (AP), and the circuitry may not configure the first value to an AID12 subfield of each user field that includes user-specific information addressed to an STA associated with the EHT AP.

In the communication apparatus according to an exemplary embodiment of the present disclosure: the first field may be positioned immediately after a common information field in the trigger frame.

In the communication apparatus according to an exemplary embodiment of the present disclosure: a first user information field addressed to an EHT STA may be subsequent to the first field.

In the communication apparatus according to an exemplary embodiment of the present disclosure: a common information field of the trigger frame may include information on whether the first field is present in the trigger frame.

In the communication apparatus according to an exemplary embodiment of the present disclosure: a first user information field of the trigger frame may include a resource unit (RU) allocation subfield and a first subfield, and the RU allocation subfield may indicate, together with the first subfield, an RU for the transmission of the EHT TB PPDU.

In the communication apparatus according to an exemplary embodiment of the present disclosure: the trigger frame may request an HE TB PPDU by a user information field of the trigger frame.

In the communication apparatus according to an exemplary embodiment of the present disclosure: the trigger frame may include the first field, a user information field for EHT, and a user information field for HE, and the trigger frame may request the EHT TB PPDU and an HE TB PPDU.

In the communication apparatus according to an exemplary embodiment of the present disclosure: the first field may include version information on the first field, and the version information may indicate one of an EHT version or a post-EHT version.

In the communication apparatus according to an exemplary embodiment of the present disclosure: the transmission of the EHT TB PPDU may be a random access.

A communication method according to an exemplary embodiment of the present disclosure includes: configuring a first value to an association ID (AID) 12 subfield of a first field of a trigger frame that requests an Extremely High Throughput (EHT) trigger-based (TB) physical-layer protocol data unit (PPDU); and transmitting the trigger frame, in which the first value indicates that the first field includes information commonly used for transmission of the EHT TB PPDU.

A communication apparatus according to an exemplary embodiment of the present disclosure includes: a receiver, which in operation, receives a trigger frame that requests an Extremely High Throughput (EHT) trigger-based (TB) physical-layer protocol data unit (PPDU) and for which a first value is configured to an association ID (AID) 12 subfield of a first field of the trigger frame; and a transmitter, which in operation, transmits the EHT TB PPDU, in which the first value indicates that the first field includes information commonly used for transmission of the EHT TB PPDU.

In the communication apparatus according to an exemplary embodiment of the present disclosure: the first value indicates that the trigger frame may include a user information field for EHT after the first field.

In the communication apparatus according to an exemplary embodiment of the present disclosure: the first value may be interpreted by a High Efficiency (HE) station (STA) as an indication that the first field is addressed to another STA.

In the communication apparatus according to an exemplary embodiment of the present disclosure: a length of the first field may be equal to a length of a first user information field of the trigger frame.

In the communication apparatus according to an exemplary embodiment of the present disclosure: the trigger frame may be transmitted from an EHT access point (AP), and the EHT AP may not configure the first value to an AID12 subfield of each user field that includes user-specific information addressed to an STA associated with the EHT AP.

In the communication apparatus according to an exemplary embodiment of the present disclosure: the first field may be positioned immediately after a common information field in the trigger frame.

In the communication apparatus according to an exemplary embodiment of the present disclosure: a first user information field addressed to an EHT STA may be subsequent to the first field.

In the communication apparatus according to an exemplary embodiment of the present disclosure: a common information field of the trigger frame may include information on whether the first field is present in the trigger frame.

In the communication apparatus according to an exemplary embodiment of the present disclosure: a first user information field of the trigger frame may include a resource unit (RU) allocation subfield and a first subfield, and the RU allocation subfield may indicate, together with the first subfield, an RU for the transmission of the EHT TB PPDU.

In the communication apparatus according to an exemplary embodiment of the present disclosure: the trigger frame may request an HE TB PPDU by a user information field of the trigger frame.

In the communication apparatus according to an exemplary embodiment of the present disclosure: the trigger frame may include the first field, a user information field for EHT, and a user information field for HE, and the trigger frame may request the EHT TB PPDU and an HE TB PPDU.

In the communication apparatus according to an exemplary embodiment of the present disclosure: the first field may include version information on the first field, and the version information may indicate one of an EHT version or a post-EHT version.

In the communication apparatus according to an exemplary embodiment of the present disclosure: the transmission of the EHT TB PPDU may be a random access.

A communication method according to an exemplary embodiment of the present disclosure may include: receiving a trigger frame that requests an Extremely High Throughput (EHT) trigger-based (TB) physical-layer protocol data unit (PPDU), in which a first value is configured to an association ID (AID) 12 subfield of a first field of the trigger frame; and transmitting the EHT TB PPDU, in which the first value indicates that the first field includes information commonly used for transmission of the EHT TB PPDU.

The disclosure of Japanese Patent Application No. 2020-180361, filed on Oct. 28, 2020, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

11 Controller
12 Transmitter
21 Receiver
22 Controller
100 AP
101 Scheduler
102 Terminal information acquirer
103 Common Info generator
104 AID controller
105 User Info generator
106 Trigger frame generator
107 Error correction encoder
108 Modulator
109 Radio transceiver
110 Demodulator
111 Error correction decoder
200 Terminal
201 Radio transceiver
202 Demodulator
203 Error correction decoder
204 Common Info acquirer
205 AID controller
206 User Info acquirer
207 Data generator
208 Error correction encoder
209 Modulator

The invention claimed is:

1. A communication apparatus, comprising:
   circuitry, which, in operation, configures a first value to an association ID (AID) 12 subfield of a first field of a trigger frame that requests an Extremely High Throughput (EHT) trigger-based (TB) physical-layer protocol data unit (PPDU), the first value indicating that the first field includes information commonly used for transmission of the EHT TB PPDU and the first field being positioned immediately after a common information field in the trigger frame; and
   a transmitter, which in operation, transmits the trigger frame.

2. The communication apparatus according to claim 1, wherein the first value indicates that the trigger frame includes a user information field for EHT after the first field.

3. The communication apparatus according to claim 1, wherein the first value is interpreted by a High Efficiency (HE) station (STA) as an indication that the first field is addressed to another STA.

4. The communication apparatus according to claim 1, wherein a length of the first field is equal to a length of a first user information field of the trigger frame.

5. The communication apparatus according to claim 1, wherein:
   the communication apparatus is an EHT access point (AP), and
   the circuitry does not configure the first value to an AID12 subfield of each user field that includes user-specific information addressed to an STA associated with the EHT AP.

6. The communication apparatus according to claim 1, wherein a first user information field addressed to an EHT STA is subsequent to the first field.

7. The communication apparatus according to claim 1, wherein a common information field of the trigger frame includes information on whether the first field is present in the trigger frame.

8. The communication apparatus according to claim 1, wherein:
   a first user information field of the trigger frame includes a resource unit (RU) allocation subfield and a first subfield, and
   the RU allocation subfield indicates, together with the first subfield, an RU for the transmission of the EHT TB PPDU.

9. The communication apparatus according to claim 1, wherein the trigger frame requests an HE TB PPDU by a user information field of the trigger frame.

10. The communication apparatus according to claim 1, wherein:
    the trigger frame includes the first field, a user information field for EHT, and a user information field for HE, and
    the trigger frame requests the EHT TB PPDU and an HE TB PPDU.

11. The communication apparatus according to claim 1, wherein:
    the first field includes version information on the first field, and
    the version information indicates one of an EHT version or a post-EHT version.

12. The communication apparatus according to claim 1, wherein the transmission of the EHT TB PPDU is a random access.

13. A communication method, comprising:
    configuring a first value to an association ID (AID) 12 subfield of a first field of a trigger frame that requests an Extremely High Throughput (EHT) trigger-based (TB) physical-layer protocol data unit (PPDU), the first value indicating that the first field includes information commonly used for transmission of the EHT TB PPDU and the first field being positioned immediately after a common information field in the trigger frame; and transmitting the trigger frame.

14. The communication apparatus according to claim 1, wherein the first value is interpreted by a High Efficiency (HE) station (STA) as an indication that the first field is addressed to an associated STA whose AID is equal to the first value.

15. The communication apparatus according to claim 1, wherein the first value is used as an AID to be assigned to an individual station in IEEE802.11ax.

16. The communication apparatus according to claim 1, wherein the first field does not include user-specific information, but a High Efficiency (HE) station (STA) interprets the first value as an indication that the first field includes the user-specific information.

17. The communication apparatus according to claim 1, wherein the first value indicates to an EHT STA that the first field does not include user-specific information, but a High Efficiency (HE) station (STA) interprets the first value as an indication that the first field includes the user-specific information.

* * * * *